(12) United States Patent
Suzuki

(10) Patent No.: US 6,829,010 B1
(45) Date of Patent: Dec. 7, 2004

(54) OPTICAL DEVICE FOR PHOTOGRAPHY

(75) Inventor: Noboru Suzuki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/282,600

(22) Filed: Mar. 31, 1999

(30) Foreign Application Priority Data

Apr. 3, 1998 (JP) .......................................... 10-091443

(51) Int. Cl.$^7$ .............................................. G02B 13/16
(52) U.S. Cl. ........................................ 348/335; 348/360
(58) Field of Search .............................. 348/335, 211.1, 348/357, 360, 361; 396/297, 298, 300, 529

(56) References Cited

U.S. PATENT DOCUMENTS

| | | | | |
|---|---|---|---|---|
| 5,751,351 A | * | 5/1998 | Mogi ......................... | 348/239 |
| 5,809,353 A | * | 9/1998 | Hirano ....................... | 396/55 |
| 5,933,661 A | * | 8/1999 | Kawanami ................... | 396/55 |
| 6,115,064 A | * | 9/2000 | Mogi ......................... | 348/239 |
| 6,348,948 B1 | * | 2/2002 | Kyuma ....................... | 348/360 |
| 6,392,702 B1 | * | 5/2002 | Arai et al. .................. | 348/335 |
| 6,445,882 B1 | * | 9/2002 | Hirano ....................... | 396/52 |
| 6,546,206 B2 | * | 4/2003 | Murakami ................... | 396/529 |
| 6,608,651 B2 | * | 8/2003 | Mabuchi et al. ............ | 348/360 |
| 2002/0075395 A1 | * | 6/2002 | Ohkawara | |
| 2002/0109784 A1 | * | 8/2002 | Suda et al. | |

* cited by examiner

Primary Examiner—Wendy R. Garber
Assistant Examiner—Jacqueline Wilson
(74) Attorney, Agent, or Firm—Morgan & Finnegan, LLP

(57) ABSTRACT

A TV optical lens system is provided which can prevent any problem to be caused by transmission of data not initialized upon a data transmission request from a camera. The system includes a movable optical member, a position detecting unit for detecting a position of the movable optical member as relative information, an initializing unit for performing an initializing operation of moving the optical member to a reference position so as to convert the information detected by the position detecting unit into absolute position information, and a communication unit for communicating with a camera mounted on the photographing lens system, wherein the system is provided with a communication inhibiting unit for inhibiting the communication by the communication unit until the initializing operation is completed.

8 Claims, 29 Drawing Sheets

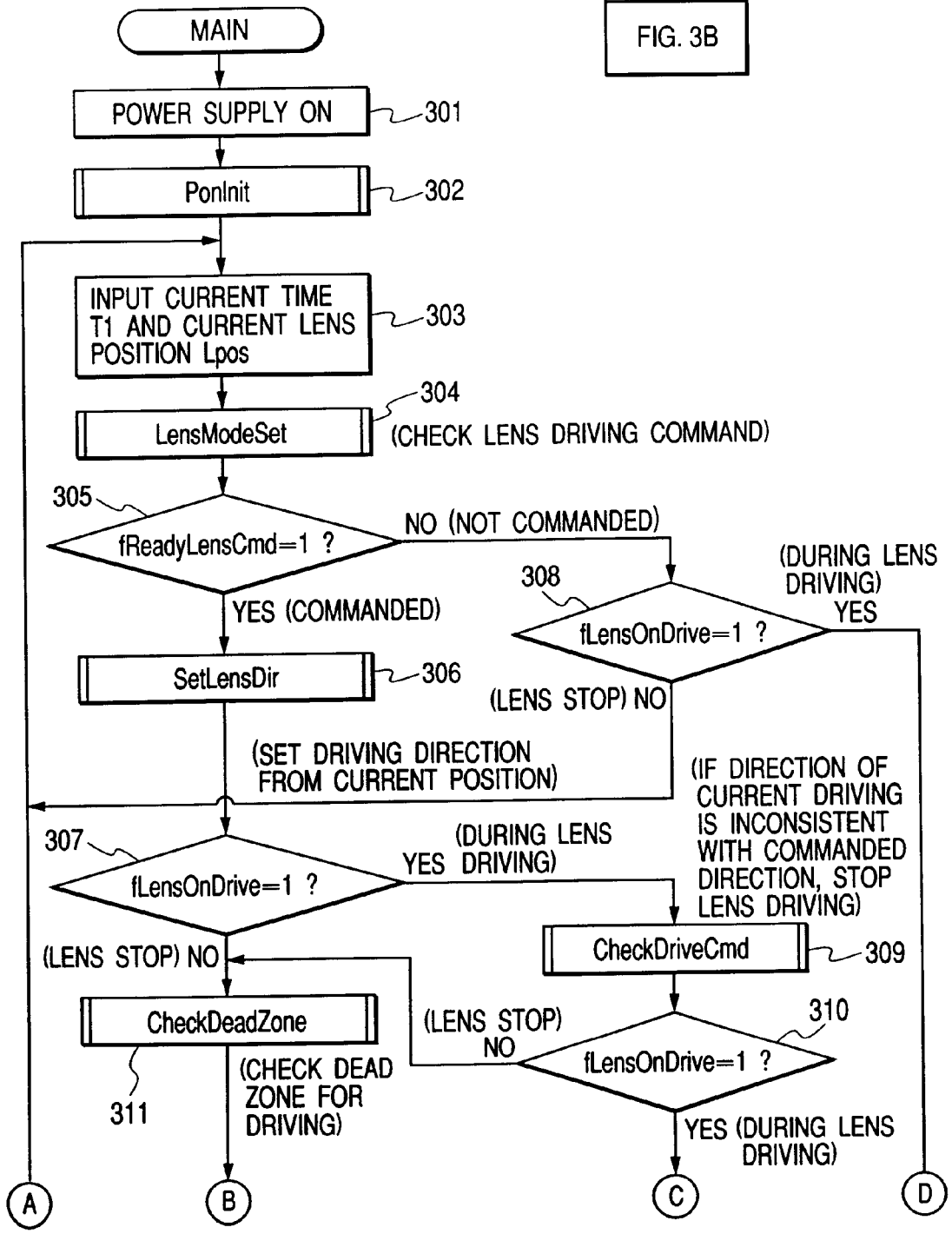

FIG. 25

| F VALUE | DEAD ZONE | STOP OFFSET |
|---|---|---|
| TO 1.4 | 5 | 3 |
| 1.4 TO 2 | 7 | 4 |
| 2 TO 2.8 | 9 | 5 |
| 2.8 TO 4 | 10 | 5 |
| 4 TO 5.6 | 11 | 6 |
| 5.6 TO 8 | 14 | 7 |
| 8 TO 11 | 15 | 7 |
| 11 TO 16 | 16 | 8 |
| 16 TO 22 | 18 | 9 |
| 22 TO | 20 | 10 |

FIG. 26

| FOCUS DISTANCE [mm] | MAGNIFICATION |
|---|---|
| 8 TO 15 | ×1.8 |
| 15 TO 30 | ×1.5 |
| 30 TO 60 | ×1.2 |
| 60 TO 120 | ×1.0 |

OPTICAL DEVICE FOR PHOTOGRAPHY

BACKGROUND OF THE INVENTION

1. Field of the Invention

The present invention relates to a taking lens for television photography.

2. Related Background Art

In a conventional broadcast television camera system, a communication is perfomed by using analog signals for the interface between a camera and a lens. For example, a lens unit is controlled by supplying a television taking lens with voltages which determines the positions of a focus lens and an iris and the speed of a zoom lens, and conversely, information of the lens unit is notified to the camera unit by transmitting voltages which indicates the positions of the focus lens, zoom lens, and iris.

Analog servo control of the taking lens is performed by using a feedback system having a potentiometer as a position sensor.

There are limits in increasing the number of types of analog signals and in a precision of analog signals. From this reason, a current tendency is that a serial interface is used for providing a communication function between a camera and a lens.

As the communication function is realized by the serial interface, a case of using CPU is uncreasing and the digital servo used with CPU is prevailing.

If the position of a lens is detected through constituted digital servo, an output of a potentiometer is required to be A/D converted. If a high resolution is necessary, an expensive A/D converter having a high resolution function is used.

Since the size of an encoder of an absolute value output type is large, an encoder of a relative value output type is used. However, since the absolute position of a lens cannot be known from the relative value output, it is necessary to perform an initializing operation of moving a lens to a reference position in order to detect the absolute position of the lens.

SUMMARY OF THE INVENTION

According to one aspect of the invention, an optical device is provided which has information means for generating or determining information on the basis of a necessary initializing operation and communication means for communicating with a camera mounted on the optical device, the optical device comprising: initializing means for executing the initializing operation; and communication inhibiting means for inhibiting the communication by the communication means until the initializing means completes the initializing operation. The optical device can prevent improper communication from being executed.

According to one aspect of the invention, an optical device is provided which has movable optical means, signal generating means for forming a signal change corresponding to a motion of the optical means, position information generating means for generating position information by forming a signal corresponding to the number of signal changes formed by the signal generating means, and communication means for communicating with a camera mounted on the optical device, the optical device comprising: initializing means for moving the optical means to a reference position so as to convert the position information generated by the position information generating means into absolute position information; and communication inhibiting means for inhibiting communication by the communication means until an initializing operation by the initializing means is completed. The optical device can prevent improper communication from being executed.

According to one aspect of the invention, a system is provided which has a photographing optical apparatus having information means for generating or determining information on the basis of a necessary initializing operation and a camera mounted on the photographing optical apparatus, the system comprising: communication means for performing communication between the photographing optical apparatus and the camera; initializing means for performing the initializing operation; and communication inhibiting means for inhibiting the communication by the communication means until the initializing means completes the initializing operation. The system can prevent improper communication from being executed.

The other objects of the invention will be become more apparent from the detailed description of embodiments when read in conjunction with the accompanying drawings.

BRIEF DESCRIPTION OF THE DRAWINGS

FIG. 3, which comprises FIGS. 3A and 3B, is a flow chart illustrating a main process to be executed by the system shown in FIG. 1.

FIG. 25 is a diagram showing lens control data 1 to be used by the process executed in the flow charts shown in FIGS. 3A and 3B.

FIG. 26 is a diagram showing lens control data 2 to be used by the process executed in the flow charts shown in FIGS. 3A and 3B.

DETAILED DESCRIPTION OF THE PREFERRED EMBODIMENTS

Figure 1:
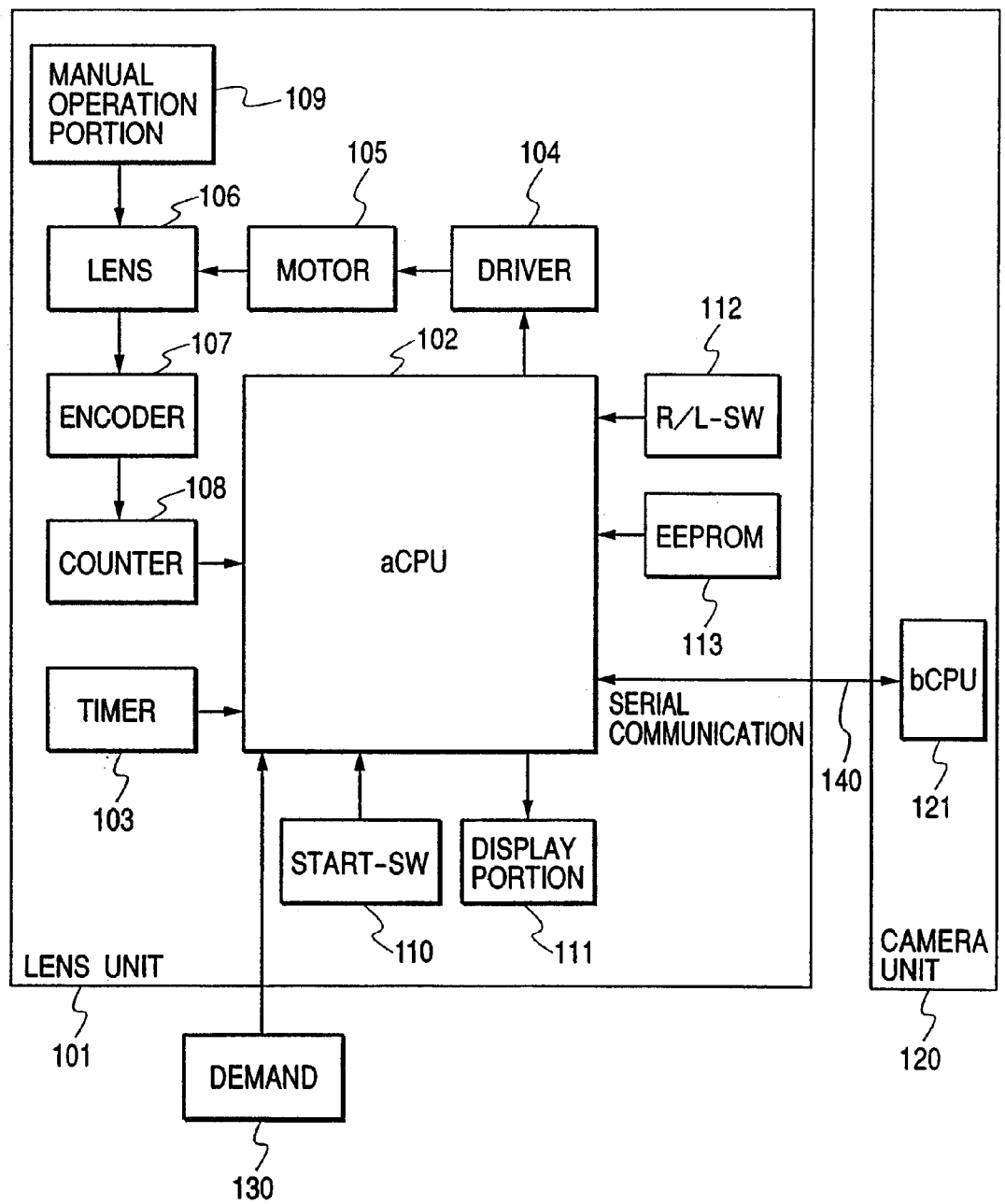
FIG. 1 is a block diagram of a system according to an embodiment of the invention.

FIG. 1 is a block diagram showing an optical device according to a first embodiment of the invention. Reference numeral 101 represents a lens unit for photography, and reference numeral 120 represents a camera unit for photography using an optical device of the lens unit 101.

Reference numeral 102 represents a first controller (hereinafter called aCPU) for managing the lens unit 101 and controlling a serve system. Reference numeral 103 represents a timer used for aCPU 102 to manage the lens unit 101. Reference numeral 104 represents a driver for driving a motor 105. Reference numeral 106 represents an optical lens connected to the motor 105. Reference numeral 107 represents an encoder for detecting a position of the optical lens 106, the encoder generating a pulse each time the optical lens moves by a unit length. Reference numeral 107 represents a counter for counting an output of the encoder 106, the count of the counter indicating a lens position.

Reference numeral 109 represents a manual operation portion for manually moving the optical lens 106.

The counter 108 and timer 103 are connected to aCPU 102 so that the aCPU 102 can know the position and speed of the optical lens 106 from the values of the counter 108 and timer 103.

Reference numeral 110 represents a start switch (START-SW) which is used when the optical lens 106 starts being driven, and reference numeral 111 represents a display portion for displaying a state of lens unit 101.

Reference numeral 112 represents a remote/local select switch (R/L-SW) for selecting either a remote mode (a mode responsive to a command on the camera unit) or a local mode (a mode responsive to a command on the lens unit) for the control of the lens unit. Reference numeral 113 represents a rewritable non-volatile memory (EEPROM) for storing data to be used by the lens unit 101.

Reference numeral 130 represents a demand to be used for requesting for a control of the optical lens 106.

The camera unit 120 has a second controller (hereinafter called bCPU) 121 which can perform serial communication via a serial communication line 140 with aCPU 102 of the lens unit 101.

The remote mode and local mode selectable by R/LSW 112 will be described.

In the remote mode, by using a control command from bCPU 121 of the camera unit 120, the optical lens 106 is controlled. In the local mode, by selecting a control command from the demand 130, the optical lens 106 is driven.

Figure 2:
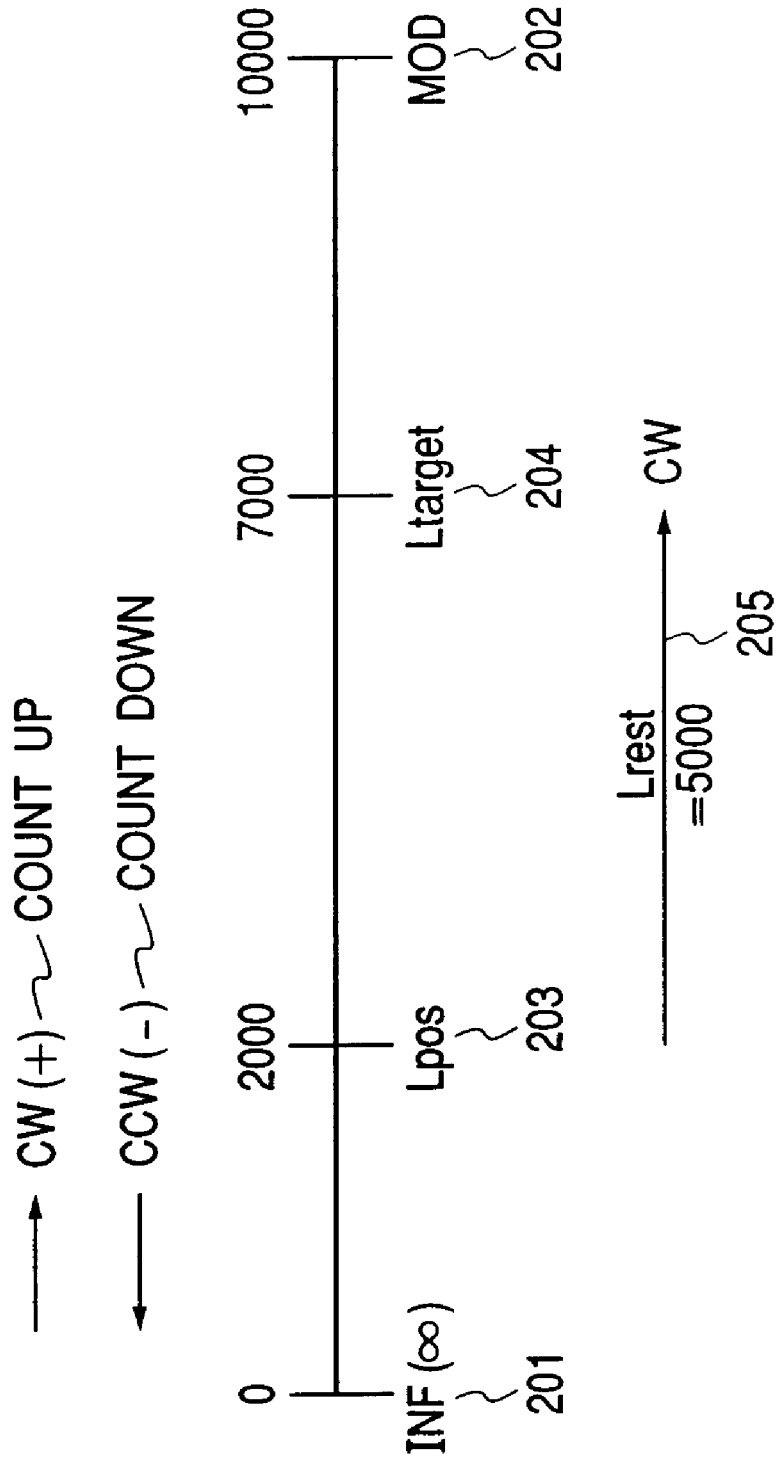
FIG. 2 is a diagram showing an absolute position of a lens shown in FIG. 1 along a lens motion direction.

Next, the moving direction of the optical lens 106 and the count of the counter 108 will be described with reference to FIG. 2, by using a focus lens as an example.

It is assumed that an INF (infinite) end 201 of a focus lens represents a count of 0 and a MOD (nearest) end 202 represents a count of 10000. It is also assumed that while the focus lens rotates in a clockwise (CW) direction, the counter counts up and the focus lens moves toward the MOD end, whereas while the focus lens rotates in a counter clockwise (CCW) direction, the counter counts down and the focus lens moves toward the INF end. For example, if the count is 2000 at a current position Lpos 203 and the count is 7000 at a target position Ltarget 204, then a motion amount Lrest 205 is given by the following equation:

$$Lrest = Ltarget - Lpos = 7000 - 2000 = 5000.$$

In this case, since Lrest>0, the focus lens is moved from the current position toward the MOD end by 5000, with its rotation direction being CW. If Lrest<0, the rotation direction is CCW. It is assumed that while the lens rotates in the CCW direction, the speed of the lens takes a negative value.

Next, the lens system will be described with reference to flow charts. In this lens system, serial communication is performed by an interrupt.

The main process will be described first with reference to FIGS. 3A and 3B.

At Step 301 a power supply of the lens unit 101 is turned on. At Step 302 a sub-routine PonInit is called to initialize the lens unit 101.

After the initialization, at Step 303 a current time T1 and a current position Lpos are input.

At Step 304 a sub-routine LensModeSet is called to check whether there is a lens driving command.

At Step 305 a flag fReadyLensCmd indicating a presence/absence of the lens driving command to be set by the sub-routine LensModeSet is checked.

If it is judged at Step 305 that there is a lens driving command (if fReadyLensCmd=1), the flow advances to Step 306 whereat a sub-routine SetLensDir is called to set a driving direction relative to the current position of the lens.

Next, it is checked at Step 307 whether the lens is being driven. If the lens is in a halt state (if fLensOnDrive=0), the flow advances to Step 311 whereat a sub-routine CheckDeadZone is called to check whether the lens is in a dead zone.

The check result at the sub-routine CheckDeadZone whether or not the lens is in the dead zone, is determined at Step 312 from a flag fDriveStart.

If it is judged at Step 312 that there is no driving permission (if fDriveStart=0), the flow returns to Step 303, whereas if it is judged that there is a driving permission (if fDriveStart=1), the flow advances to Step 313 whereat a sub-routine PrepDrive is called to set driving start data. After the driving start data is set, a sub-routine LensDriveStart is called at Step 314 to start driving the lens.

When the lens starts being driven, the lens is driven under a PID control at Step 315.

The PID control is general proportion/integration/differentiation control, which is not relevant to the main aspect of the invention so that the description thereof is omitted. Since the PID control uses a digital control with a constant sampling period, the PID control may be performed through an interrupt process using a timer interrupt.

At Step 316 a sub-routine CheckLensStopPos is called to judge whether the lens reaches a target position.

In addition, at Step 317 a flag fReachStopPos is checked to judge whether the lens reaches a target position.

If it is judged that the lens reaches the target position (if fReachStopPos=1), the flow advances to Step 320 whereat a sub-routine ReachPos is called to perform a process upon reaching the target position. After the process upon reaching the target position is completed at Step 320, the flow returns to Step 303. If it is judged at Step 317 that the lens does not reach the target position (if fReachStopPos=0), the flow advances to Step 318 whereat a sub-routine CheckLensSts is called to check an over error state of the lens.

At Step 319 the check result of the sub-routine CheckLensSts at Step 318 is determined from a flag fLensStsErr.

If it is judged at Step 319 that the lens is in an over error state (if fLensStsErr=1), the flow advances to Step 321 whereat a sub-routine OverError is called to perform an over error process. After this process is completed, the flow returns to Step 303.

If it is judged at Step 319 that the lens is not in the over error state (if fLensStsErr=0), the flow returns to Step 303.

If it is judged at Step 305 that there is no lens driving command (if fReadyLensCmd=0), the flow advances to Step 308 whereat it is checked from a flag fLensOnDrive whether the lens is being driven or in a halt state.

If it is judged at Step 308 that the lens is in the halt state (if fLensOnDrive=0), the flow returns to Step 303. If it is judged that the lens is being driven (if fLensOnDrive=1), the flow advances to Step 315 to perform the PID control.

If it is judged at Step 307 that the lens is being driven (if fLensOnDrive=1), the flow advances to Step 309 whereat a sub-routine CheckDriveCmd is called to compare a current driving direction with a new driving direction to check whether they are inconsistent.

The check result is determined at Step 310 from the flag fLensOnDrive.

If the driving direction is inconsistent and the lens is stopped by the sub-routine CheckDriveCmd, then it is judged at Step 310 that the lens is in the halt state (fLensOnDrive=0) and the flow advances to Step 311 to again drive the lens in accordance with a new command.

If it is judged at Step 310 that the lens is being driven (if fLensOnDrive=1), then it is judged at Step 309 by the sub-routine CheckDriveDir that the driving direction is not inconsistent and the flow advances to Step 315 to drive the lens under the PID control.

Figure 4:
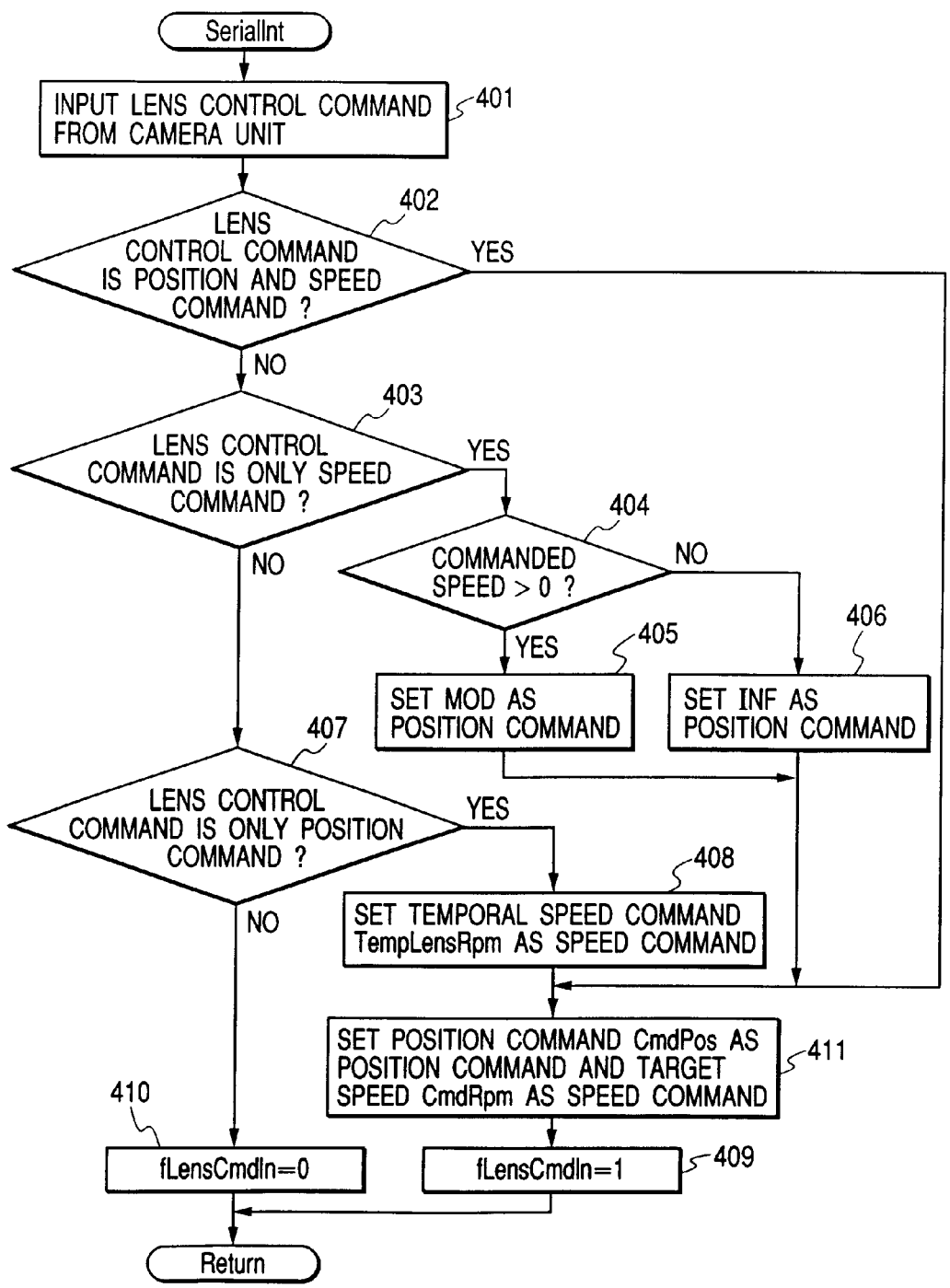
FIG. 4 is a flow chart illustrating a serial communication interrupt process in the flow charts shown in FIGS. 3A and 3B.

Next, with reference to FIG. 4, a serial communication interrupt process will be described.

When a serial communication interrupt is issued from the camera unit 120, the control skips to a sub-routine SerialInt, and at Step 401 the camera unit inputs a lens control command.

At Step 402, it is checked whether the lens control command is position and speed commands. If it is judged that the lens control command is the position and speed commands, the flow advances to Step 411 whereat the camera position command is set to CmdPos as a position command and the camera speed command is set to CmdRpm as a target speed. Thereafter, the flow advances to Step 409 whereat a flag is set as fLensCmdIn=1 indicating that there was the lens driving command, to thereafter terminate the sub-routine SerialInt.

If the condition at Step 402 is not satisfied, the flow advances to Step 403 whereat it is checked whether the lens control command is only the speed command.

If it is judged that the lens control command is only the speed command, the flow advances to Step 404 whereat the sign of the speed command is checked. If the sign is positive, it means that the command make the lens move toward the MOD end. Therefore, at Step 405 the MOD end is set as the camera position command to follow Step 411.

If the condition at Step 404 is not satisfied, it is judged that the sign is negative. At Step 406 the INF end is set as the camera position command to follow Step 411.

If the condition at Step 403 is not satisfied, the flow advances to Step 407 whereat it is checked whether the lens control command is only the position command. If it is judged that the lens control command is only the position command, the flow advances to Step 408 whereat a temporal speed command TempLensRpm is set as the camera speed command to follow Step 411.

If the condition at Step 407 is not satisfied, it is judged that the lens control command is inconsistent to follow Step 410 whereat the flag is set as fLensCmdIn=0 indicating that there was no lens driving command, to thereafter terminate the sub-routine SerialInt.

In this example of serial communication, the lens control command is issued from the camera unit. Various other commands may be used, such as a command of requesting for the lens position Lpos from the camera unit. In response to serial communication, the lens unit supplies the camera unit with Lpos or other specific data.

A process specific to the embodiment will be described hereinunder with reference to FIG. 5.

Figure 3B:
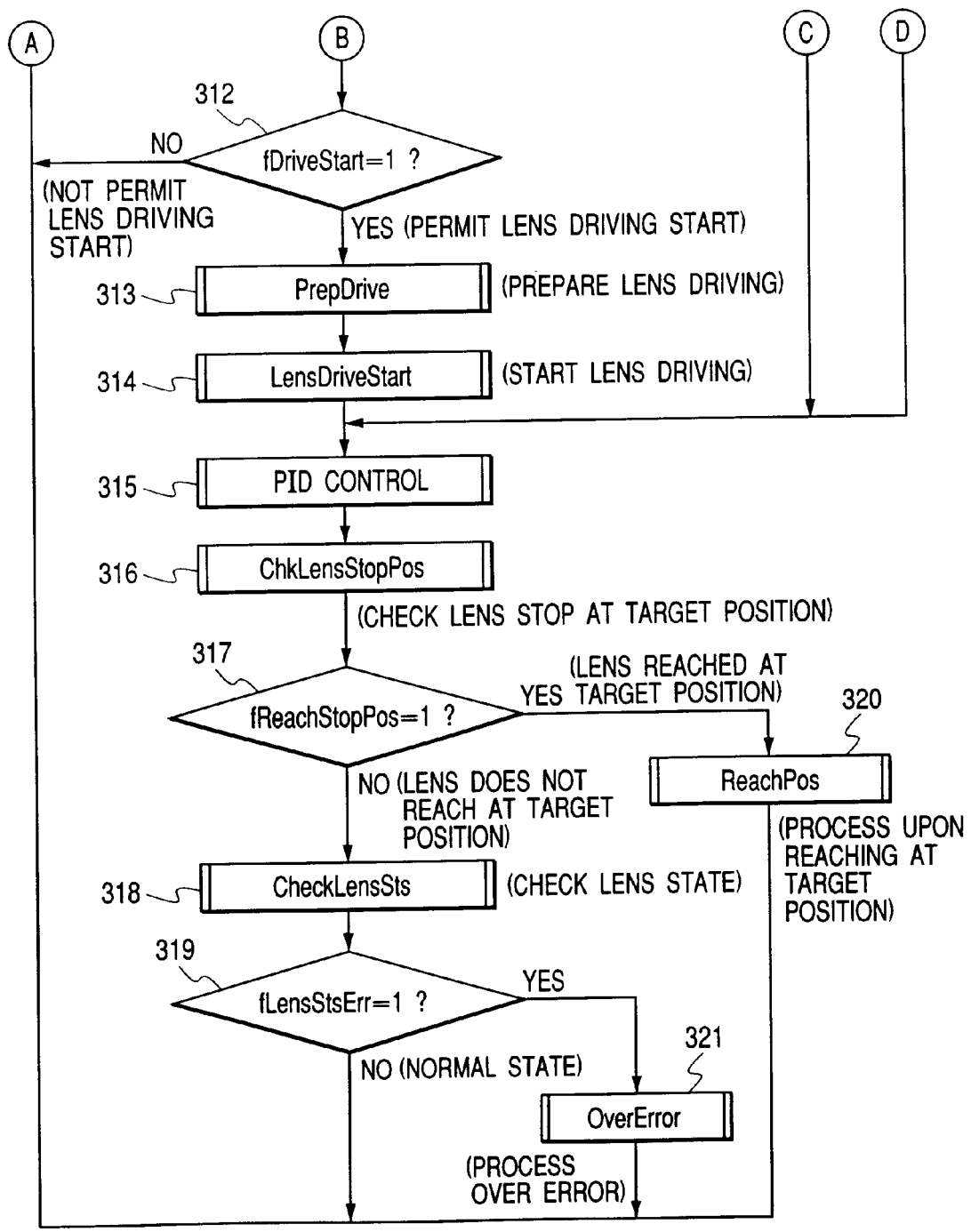
Figure 5:
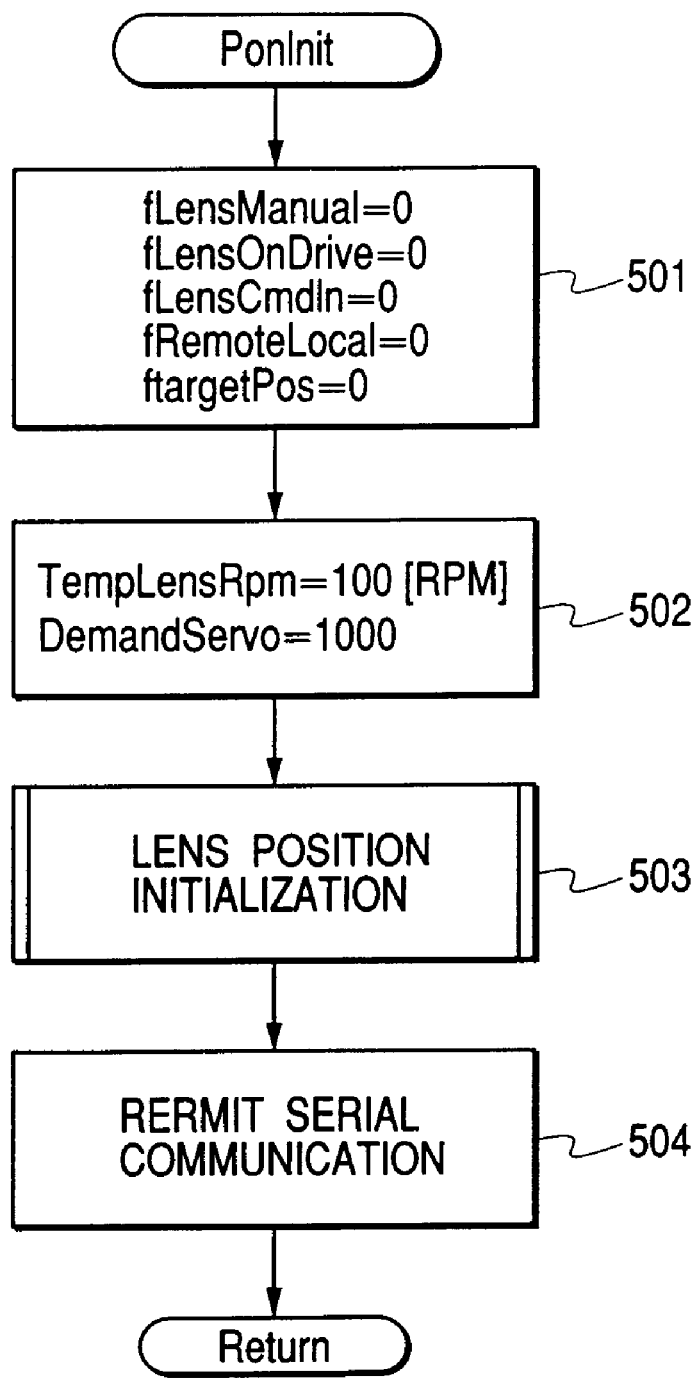
FIG. 5 is a flow chart illustrating an initializing process in the flow charts shown in FIGS. 3A and 3B.

FIG. 5 is a flow chart illustrating the operation of the sub-routine PonInit shown in FIGS. 3A and 3B. This sub-routine performs an initializing process.

First, at Step 501 flags are initialized as in the following:
fLensManual=0 (setting a servo mode);
fLensOnDrive=0 (lens in a halt);
fLensCmdIn=0 (no lens control command);
fRemoteLocal=0 (local mode); and
fTargetPos=0 (clear target position reaching).
At Step 502 data is initialized as in the following:
Setting of Temporal Speed Command TempLensRpm= 100 [RPM]; and
Manual Mode Release Demand Operation Amount in Local mode
DemandServo=1000.
Next, at Step 503 a sub-routine LensPosInit is called to initialize the lens position. If an encoder of an absolute value output type cannot be used as in this embodiment and an encoder of a relative value output type is used, then the absolute value of the lens cannot be determined, when the power supply is turned on. In order to determine the lens absolute position, for example, an unrepresented switch is mounted on the INF end and the focus lens is moved toward the INF end and stopped when the switch is activated to know the INF end whose position data is set as the contents of a sub-routine LensPosInit.

At this time, the counter is set to 0 so that the absolute position of the focus lens can be detected by using the count of 0 as the INF end. When the lens system is initialized, serial communication is permitted at Step 504.

The process in the main routine shown in FIGS. 3A and 3B other than the above-described process specific to the embodiment shown in FIG. 5 will be described hereinunder.

Figure 6:
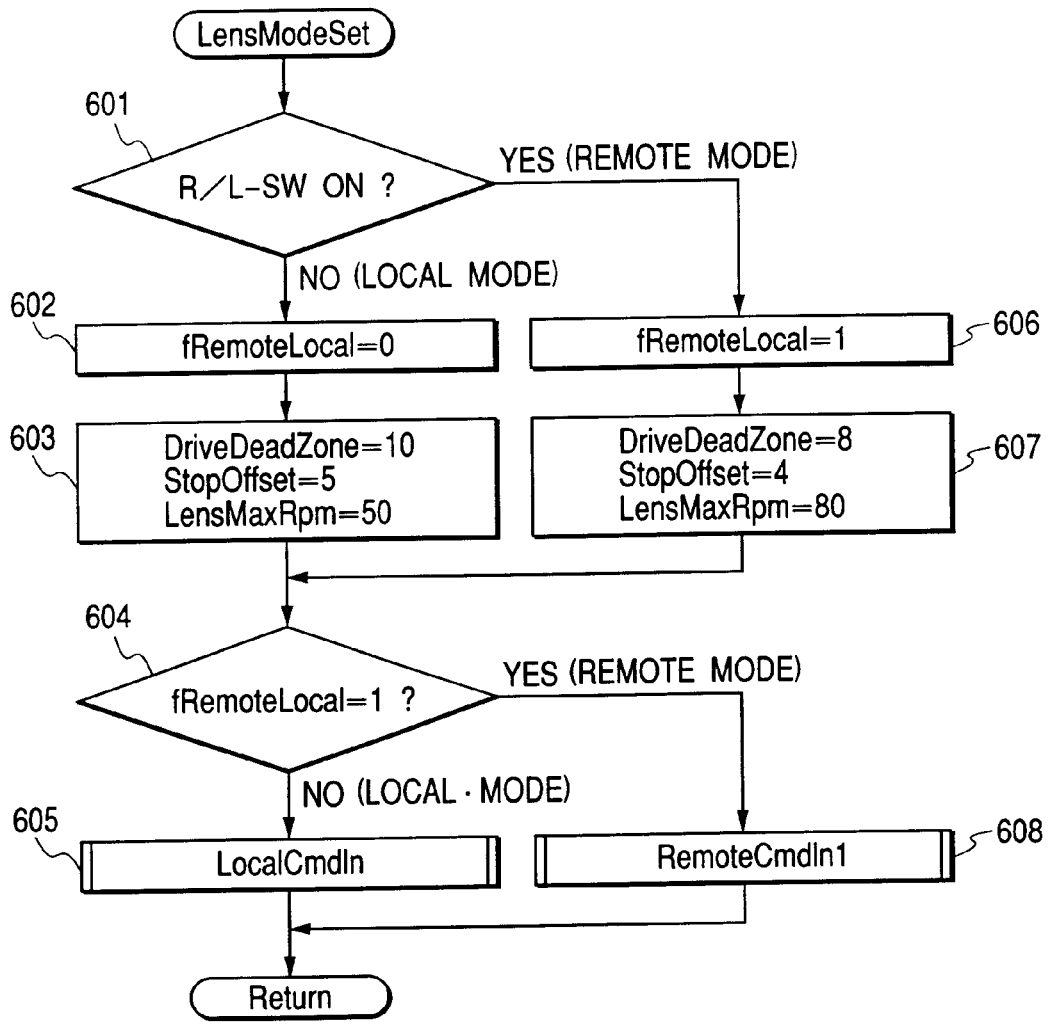
FIG. 6 is a flow chart illustrating a lens mode setting process shown in the flow charts shown in FIGS. 3A and 3B.

A sub-routine LensModeSet will be described with reference to FIG. 6.

At Step 601 the state of R/L-SW is checked. If this switch is on, it means the remote mode and at Step 606 a remote/local setting flag is set as fRemoteLocal =1. Next, at Step 607 remote mode data is set as in the following:

Setting amount of driving dead zone: DriveDeadzone =8;

Setting stop offset: StopOffset=4; and

Setting lens maximum speed: LensMaxRpm=80.

At Step 604 the remote/local setting state is checked.

If the mode is the remote mode (if fRemoteLocal=1), the flow advances to Step 608 whereat a sub-routine RemoteCmdInl is called to thereafter terminate the sub-routine LensModeSet.

If it is judged at Step 601 that R/L-SW is off, it means the local mode and the flow advances to Step 602 whereat the remote/local setting flag is set as fRemoteLocal=0. At Step 603, local mode data is set as in the following:

Setting amount of driving dead zone: DriveDeadZone =10;

Setting stop offset: StopOffset=5; and

Setting lens maximum speed: LensMaxRpm=50.

The flow thereafter advances to Step 604.

If it is judged at Step 604 that the mode is the local mode (if fRemoteLocal=0), the flow advances to Step 605 whereat a sub-routine LocalCmdIn is called to thereafter terminate the sub-routine LensModeSet.

The features of lens motion can be changed between the remote and local modes by setting different values to the data of the dead zone amount, stop offset, and maximum speed. Specifically, since a high motion performance is required in the remote mode, high sensitivity data is set, whereas low sensitivity data is set in the local mode to reduce motor driving current.

Figure 7:
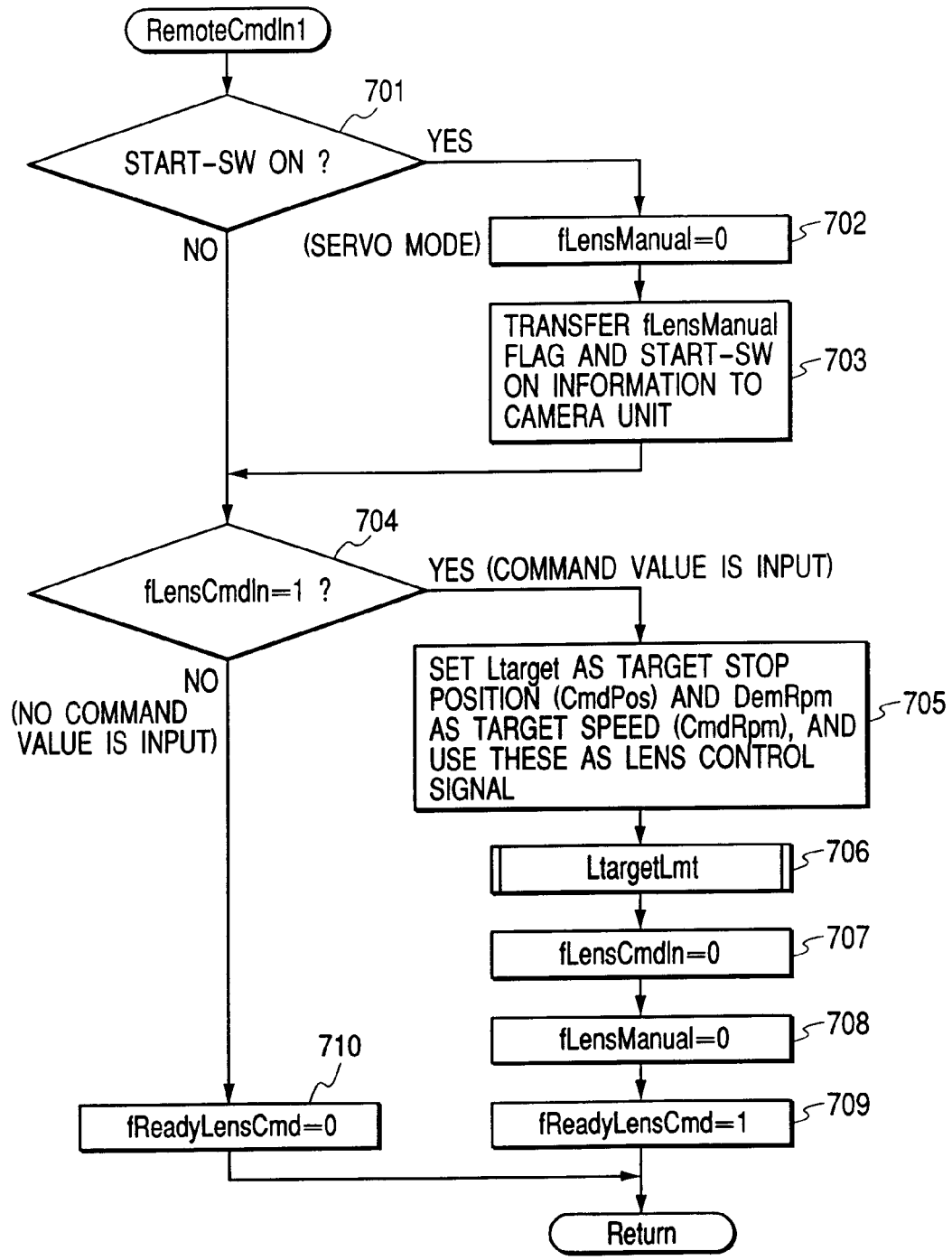
FIG. 7 is a flow chart illustrating a lens remote mode process 1 in the flow charts shown in FIGS. 3A and 3B.

With reference to FIG. 7, the sub-routine RemoteCmdInl will be described.

At Step 701 the state of START-SW 110 is checked. If SW 110 is on, the flow advances to Step 704 whereat the input state of a lens driving command is checked. If there is no command value (if fLensCmdIn=0), at Step 710 a flag is set as fReadyLensCmd=0 indicating that the lens control command is not effective, to thereafter terminate the sub-routine RemoteCmdIn1.

If START-SW 110 is on at Step 701, the flow advances to Step 702 whereat the flag is set as fLensManual=0 to set the lens to the servo mode. In order to notify the camera of this lens state, the flag fLensManual (servo mode state) and START-SW on-state information are transmitted over serial communication to thereafter follow Step 704.

If it is judged at Step 704 that there is a command value (if fLensCmdIn=1), then at Step 705 the position command (CmdPos) is set to a target stop position Ltarget and the target speed (CmdRpm) is set to a command speed (DemRpm) to thereby use them as lens control signals.

Since the command values are used as control signals, in order to check the effective range of the command values, the flow advances to Step 706 whereat a sub-routine LtargetLmt is called. In order to enter the next command, the flag is set as fLensCmdIn=0 at Step 707.

As the manual mode release (setting the servo mode) of a camera command, the flag is set as fLensManual 0 at Step 708. At Step 709 the flag is set as fReadyLensCmd=1 indicating that the lens control command is effective, to thereafter terminate the sub-routine RemoteCmdIn1.

Figure 8:
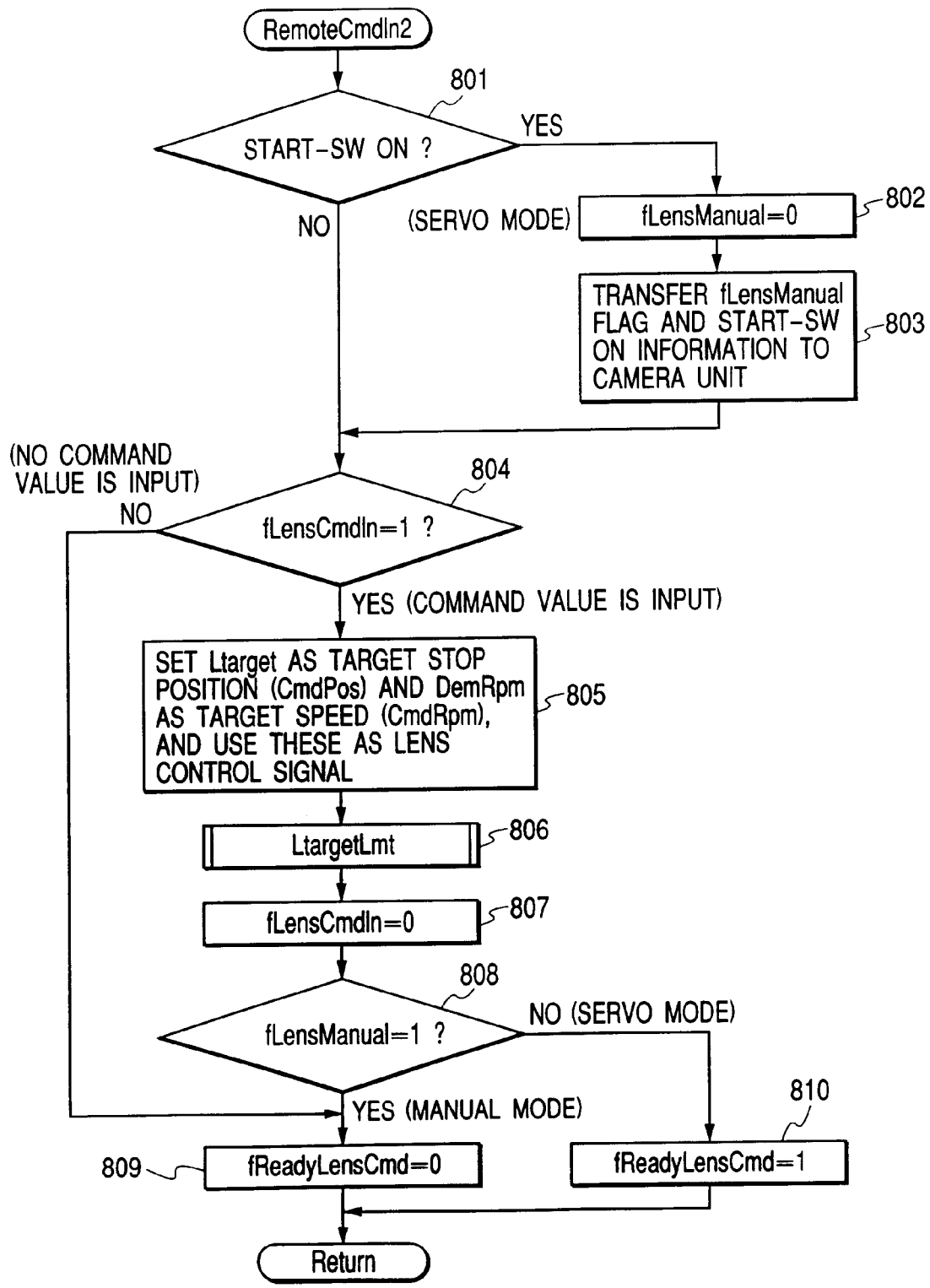
FIG. 8 is a flow chart illustrating a lens remote mode process 2 in the flow charts shown in FIGS. 3A and 3B.

In the sub-routine RemoteCmdIn1, the manual mode release (setting the servo mode) is executed either by the on-state of START-SW 110 or the camera lens control command. As another embodiment, the manual mode release may be executed only by the on-state of START-SW 110, which will be described with reference to FIG. 8. In this embodiment, the sub-routine is called RemoteCmdIn2.

At Step 801 it is checked whether START-SW 110 is on. If SW 110 is on, at Step 802 the flag is set as fLensManual=0 (servo mode). In order to notify the camera of this information, at Step 803 the flag fLensManual (servo mode state) and START-SW on-state information are transmitted over serial communication to thereafter follow Step 804.

If it is judged at Step 801 that SW 110 is off, the flow advances to Step 804 whereat it is checked whether the camera issues a lens control command. If the command value is not entered (if fLensCmdIn=0), the flow advances to Step 809 whereat the flag is set as fReadyLensCmd=0 indicating that the lens control command is not effective, to thereafter terminate the sub-routine RemoteCmdIn2.

If the command value is entered at Step 804 (if fLensCmdIn=1), then at Step 805 the position command (CmdPos) is set to the target stop position Ltarget and the target speed (CmdRpm) is set to the command speed (DemRpm) to thereby use them as lens control signals.

Since the command values are used as control signals, in order to check the effective range of the command values, the flow advances to Step 806 whereat the sub-routine LtargetLmt is called. In order to enter the next command, the flag is set as fLensCmdIn=0 at Step 807.

It is checked at Step 808 whether the lens is in the servo mode. If it is judged that the lens is in the manual mode (fLensManual=1), the flow advances to Step 809. If it is judged that the lens is in the servo mode (fLensManual=0), at Step 810 the flag is set as fReadyLensCmd=1 indicating that the lens control command is effective, to thereafter terminate the sub-routine RemoteCmdIn2.

Figure 9:
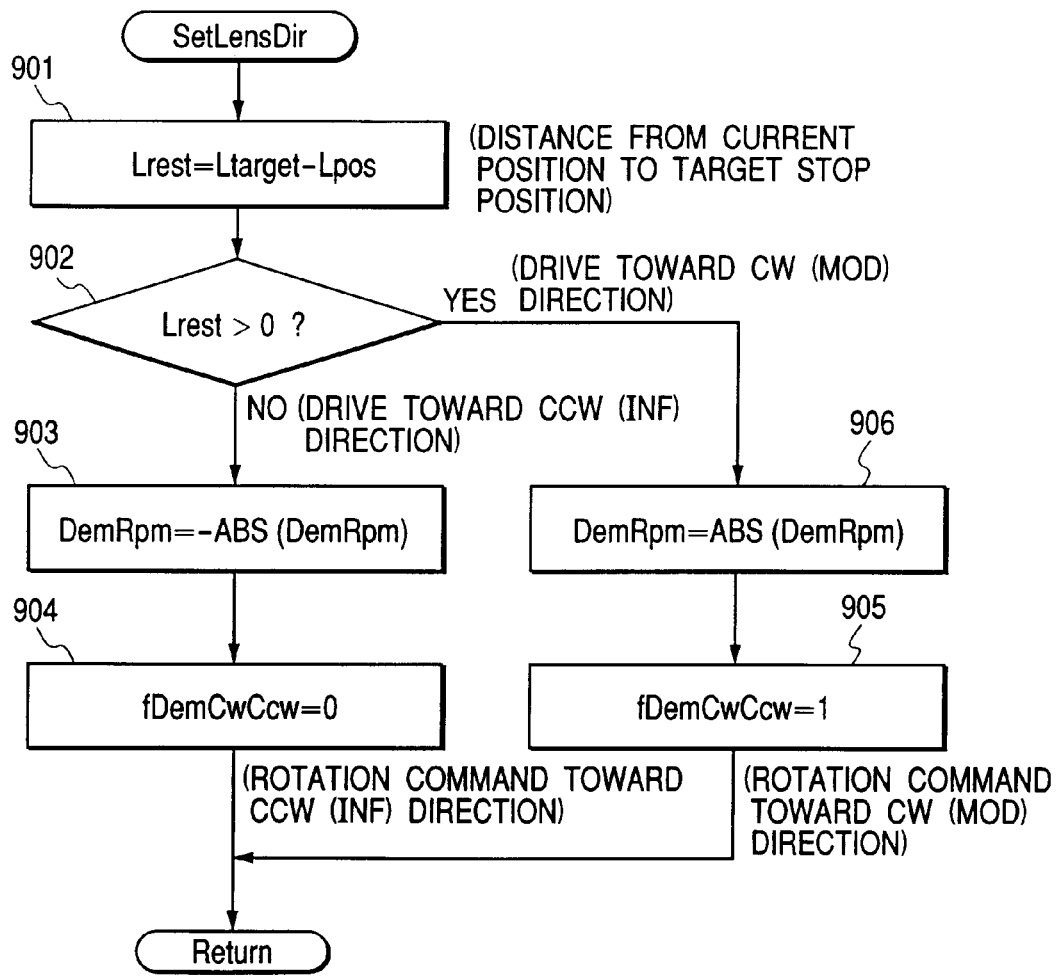
FIG. 9 is a flow chart illustrating a lens driving direction setting process in the flow charts shown in FIGS. 3A and 3B.

With reference to FIG. 9, the sub-routine SetLensDir will be described.

At Step 901, a motion distance Lrest from the current position Lpos to the target stop position Ltarget is calculated from the following equation:

$$Lrest = Ltarget - Lpos \quad (1)$$

At Step 902 the motion direction is checked from the sign of Lrest. If Lrest>0, it means the rotation in the CW (MOD) direction so that the flow advances to Step 906 whereat the sign of the command speed DemRpm is made positive in accordance with the following equation:

$$DemRpm = ABS(DemRpm) \quad (2)$$

ABS (X) means an absolute value of X. At Step 905 a flag is set as fDemCwCcw=1 indicating a rotation command in the CW (MOD) direction, to thereafter terminate the sub-routine SetLensDir. If Lrest is negative at Step 902, the flow advances to Step 903 to make the sign of the command speed DemRpm negative in accordance with the following equation:

$$DemRpm = -ABS(DemRpm) \quad (3)$$

At Step 904 the flag is set as fDemCwCcw=0 indicating the rotation command in a CCW (INF) direction, to thereafter terminate the sub-routine SetLensDir.

Figure 10:
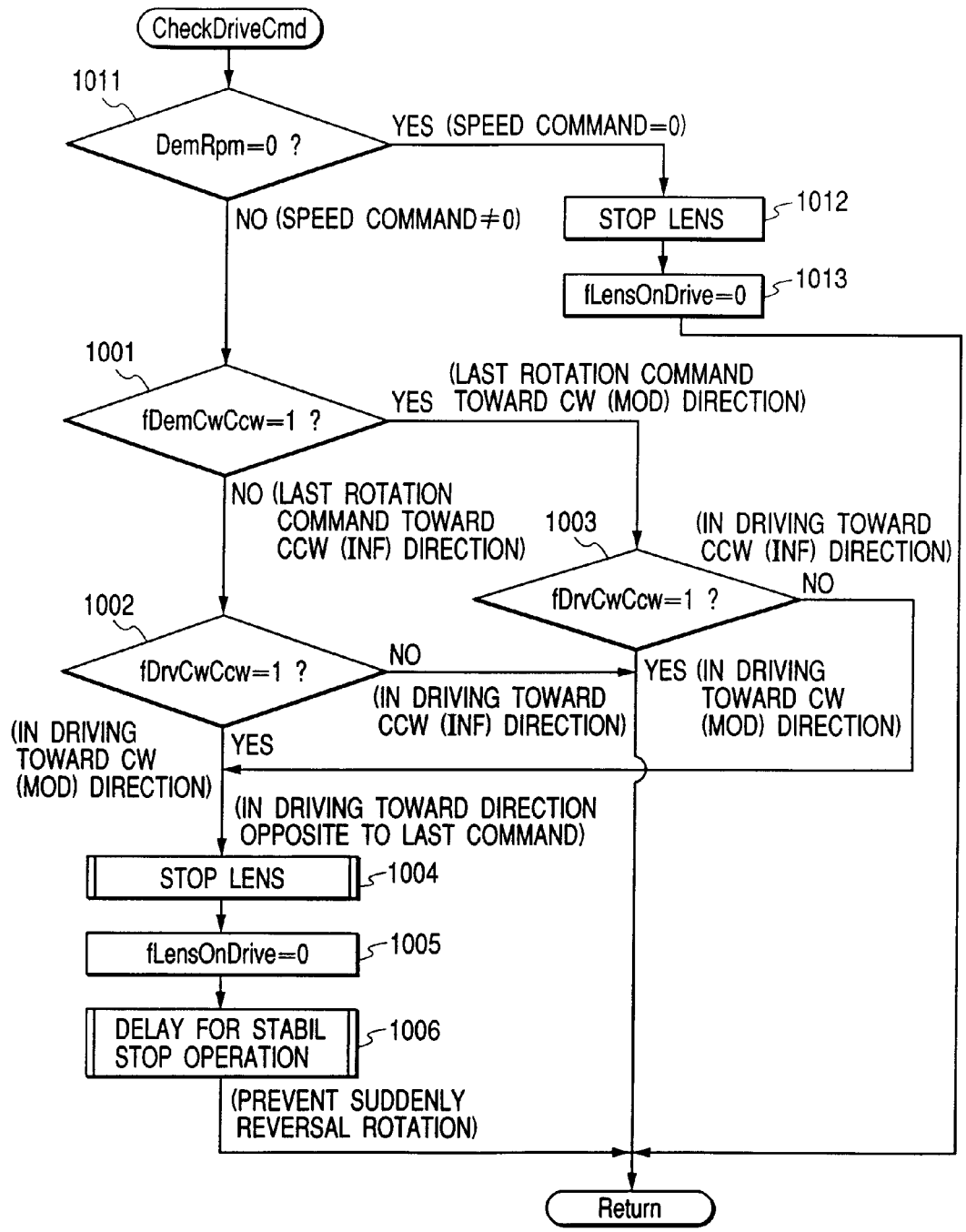
FIG. 10 is a flow chart illustrating a lens driving direction checking process in the flow charts shown in FIGS. 3A and 3B.

With reference to FIG. 10, the sub-routine Check-DriveCmd will be described.

At Step 1011 the speed command DemRpm is checked. If the speed command is DemRpm=0, it means a lens stop request command and the flow advances to Step 1012 whereat the lens is stopped. At Step 1013 the driving flag is set as fLensOnDrive=0, to thereafter terminate the sub-routine CheckDriveCmd.

If the speed command is DemRpm≠0 at Step 1011, the flow advances to Step 1001 whereat the rotation direction of the last command is checked. If the flag fDemCwCcw=1 (rotation request in CW direction), the flow advances to Step 1003 whereat the current commanded lens rotation direction is checked. If fDrvCwCcw=1, it required that the current lens rotation direction is in the CW (MOD) direction and the rotation directions are coincident with the commanded direction so that the sub-routine CheckDriveCmd is terminated.

If fDrvCwCcw=0 at Step 1003, it means that the current lens rotation is in the CCW (INF) direction and the rotation directions are not coincident with the commanded direction so that the flow advances to Step 1004 whereat the lens is stopped. Since the lens was stopped, at Step 1005 the driving flag is set as fLensOnDrive=0, and at Step 1006 a delay for stable lens stop is effected. This delay prevents vibrations to be caused by a sudden reversal rotation which is performed in accordance with a command of change the direction from the current driving direction to the next reversed driving direction. If this delay is too long, a response to the command becomes poor so that a delay is preferably set to 20 to 50 msec while a mechanical time constant is taken into consideration.

After the delay is effected at Step 1006, the sub-routine CheckDriveCmd is terminated. If fDemCwCcw=0 at Step 1001 (rotation request in the CCW direction), the flow advances to Step 1002 to check the current lens rotation direction. If fDrvCwCcw=0, the current lens rotation direction is in the CCW (INF) direction and coincident with the commanded direction so that the sub-routine Check-DriveCmd is terminated.

If fDrvCwCcw=1 (rotation direction in the CW direction) at Step 1002, the current lens rotation direction is in the CW (MOD) direction and is not coincident with the commanded direction so that the flow advances to Step 1004 to perform the same processes as above.

Figure 11:
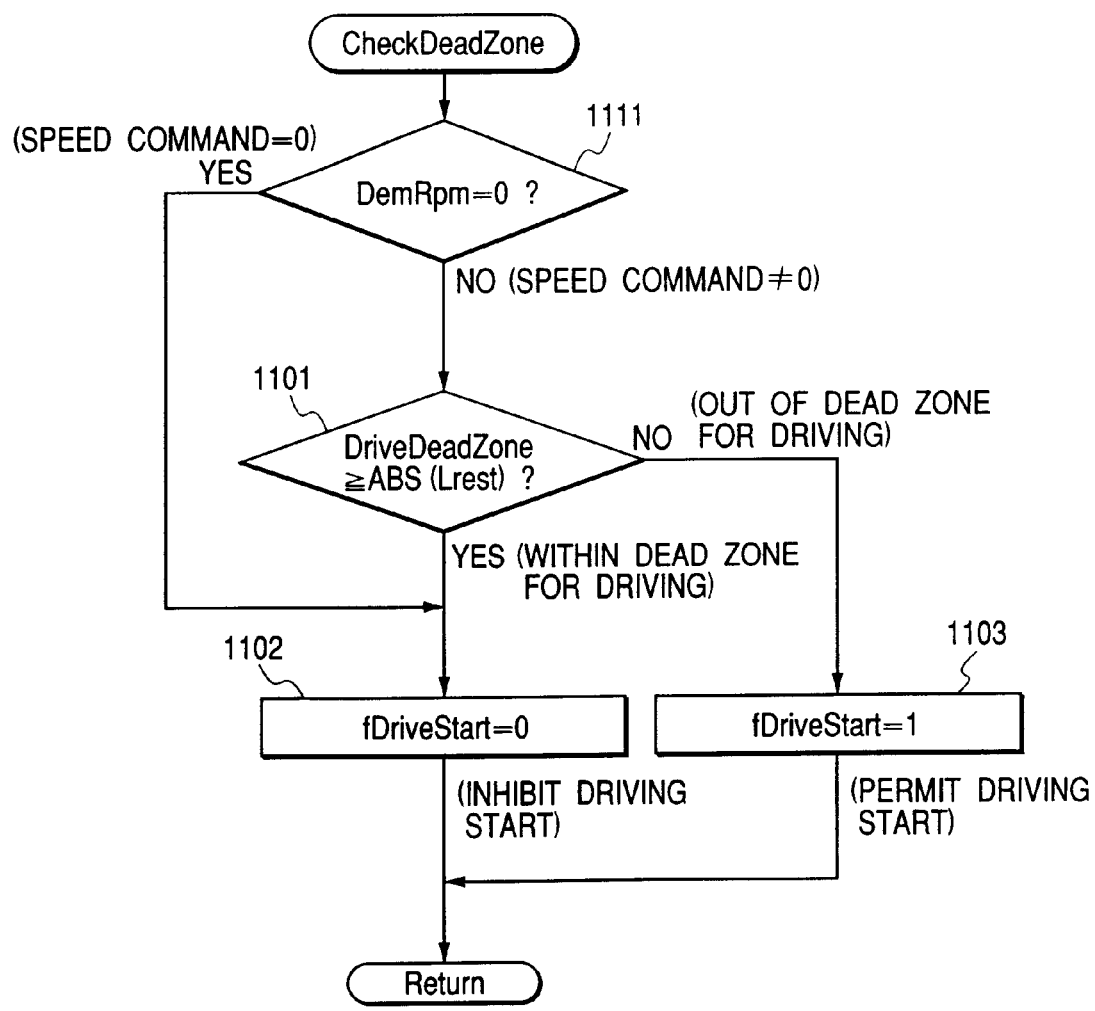
FIG. 11 is a flow chart illustrating a driving dead zone checking process in the flow charts shown in FIGS. 3A and 3B.

With reference to FIG. 11, the sub-routine CheckDead-Zone will be described.

The speed command DemRpm is checked at Step 1111. If the speed command is DemRpm=0, the flow advances to Step 1102 to inhibit the driving start. If the speed command is DemRpm≠0, the flow advances to Step 1101 whereat the motion amount Lrest from the current position Lpos to the target stop position Ltarget is checked from the following formula:

$$DriveDeadzone \geq ABS(Lrest) \tag{4}$$

If the formula (4) is satisfied, it means that the lens motion amount Lrest is equal to or smaller than the dead zone DriveDeadzone, so that at Step 1102 a driving start permission flag is set as fDriveStart=0 to inhibit the driving start and thereafter terminate the sub-routine CheckDeadZone.

If the formula (4) is not satisfied at Step 1101, it means that the lens motion amount Lrest is larger than the dead zone DriveDeadzone, so that at Step 1103 the driving start permission flag is set as fDriveStart=1 to permit the driving start, to thereafter terminate the sub-routine CheckDead-zone.

Figure 12:
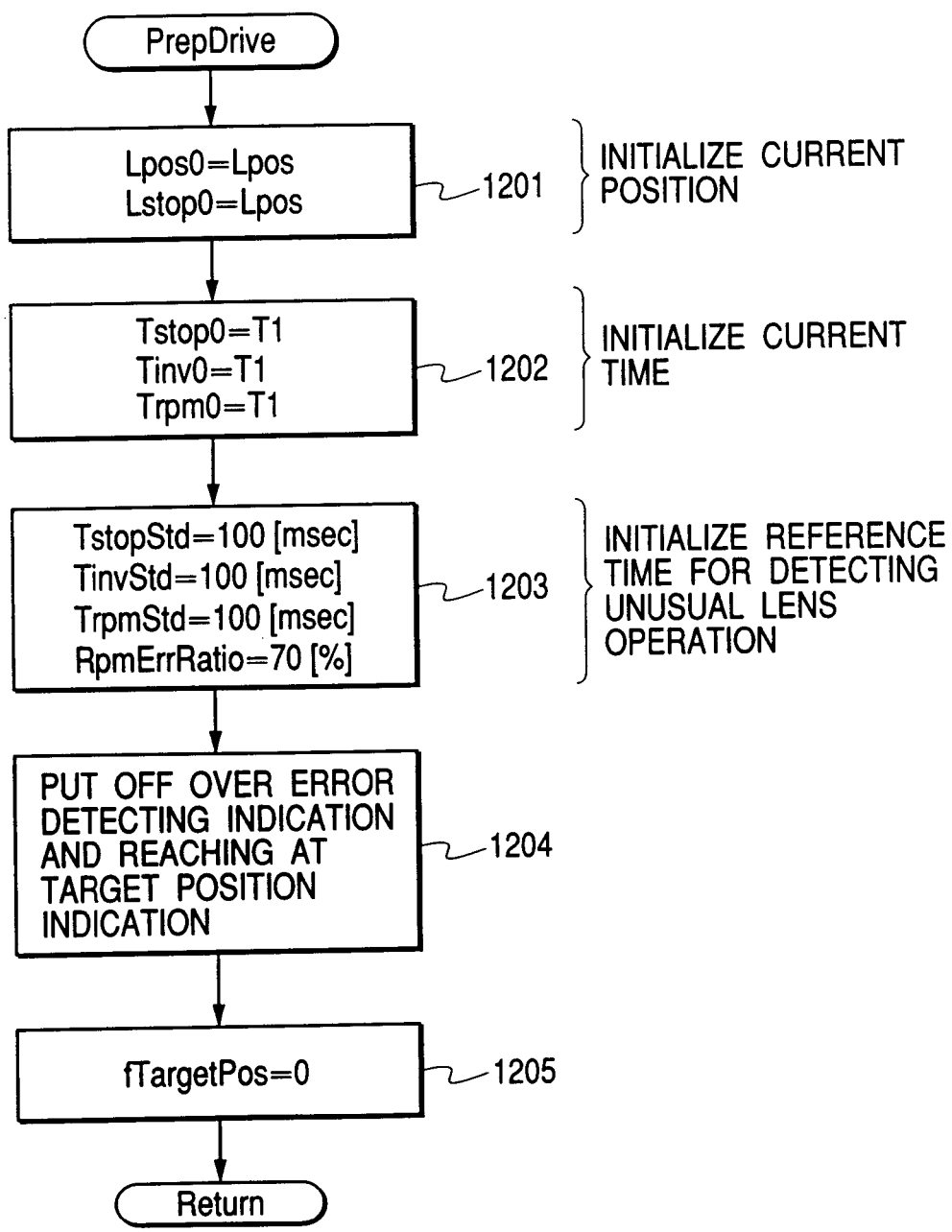
FIG. 12 is a flow chart illustrating a lens driving preparatory process in the flow charts shown in FIGS. 3A and 3B.

With reference to FIG. 12, the sub-routine PrepDrive will be described.

At Step 1201 the lens current position Lpos is set as in the following:

Speed calculation position buffer: Lpos0=Lpos; and

Stop detection position buffer: Lstop0=Lpos.

At Step 1202, the current time T1 is set as in the following to detect an over error:

Stop detection timer buffer: Tstop0=T1;

Inverse motion detection time buffer: Tinv0=T1; and

Speed error abnormality detection timer buffer: Trpm0=T1.

At Step 1203, an over error detection standard timer and the like are set as in the following manner:

Stop detection standard time buffer: TstopStd=100 msec:

Inverse motion detection standard time buffer: TinvStd=100 msec:

Speed error abnormality detection standard time buffer: TrpmStd=100 msec: and

Speed error abnormality ratio standard buffer: RpmErrRatio=70%.

After each data is initialized, at Step 1204 over error detecting information and target position reaching information are put off. At Step 1205 the target position reaching flag is set as fTargetPos=0, to thereafter terminate the sub-routine PrepDrive.

Figure 13:
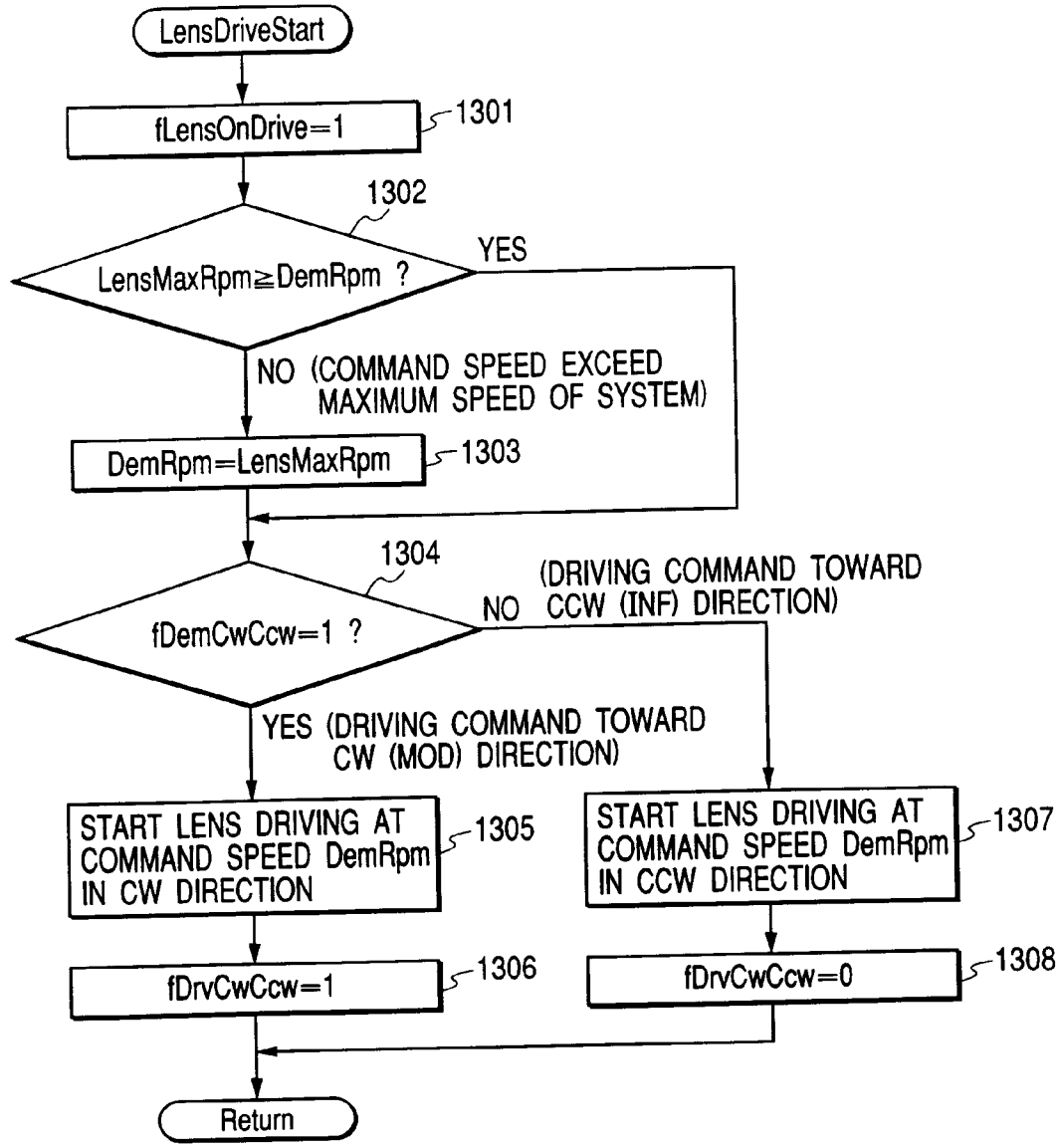
FIG. 13 is a flow chart illustrating a lens driving start process in the flow charts shown in FIGS. 3A and 3B.

With reference to FIG. 13, the sub-routine LensDriveStart will be described.

At Step 1301 the flag is set as fLensOnDrive=1 indicating the lens is being driven. At Step 1302 it is checked from the following formula whether the speed command DemRpm exceeds the lens system maximum speed LensMaxRpm:

$$LensMaxRpm \geq DemRpm \tag{5}$$

If the formula (5) is satisfied, the flow advances to Step 1304, whereas if the formula (5) is not satisfied, the flow advances to Step 1303 whereat the value of LensMaxRpm is set with the speed command DemRpm to follow Step 1304.

At Step 1304, the driving direction is checked. If the requested driving direction is the CW direction (if DemCwCcw=1), at Step 1305 the lens starts being driving in the CW direction at the speed command DemRpm. At Step 1306 the driving direction flag is set as fDrvCwCcw=1, to thereafter terminate the sub-routine LensDriveStart.

If the driving request is in the CCW direction (if fDemCwCcw=0) at Step 1304, then at Step 1307 the lens starts being driven in the CCW direction at the speed command DemRpm. At Step 1308 the driving direction flag is set as fDrvCwCcw=0, to thereafter terminate the sub-routine LensDriveStart.

Figure 14:
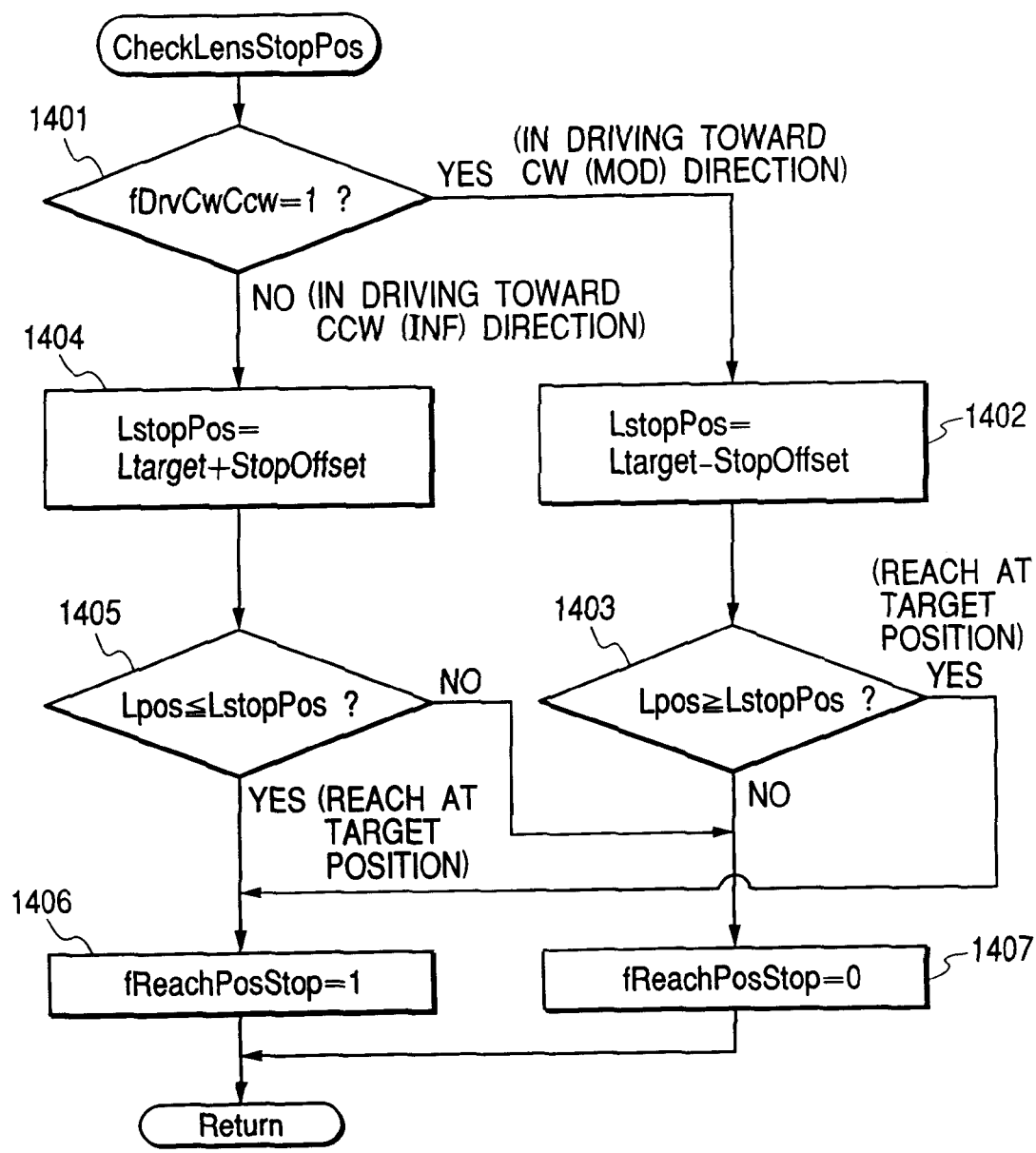
FIG. 14 is a flow chart illustrating a lens stop position check process in the flow charts shown in FIGS. 3A and 3B.

With reference to FIG. 14, a sub-routine CheckLensStop-Pos will be described.

At Step 1401 the current driving direction is checked. If the current drive direction is the CW (MOD) direction (if fDrvCwCcw=1), the flow advances to Step 1402 whereat a stop position actually stopped is calculated from the target stop position Ltarget by the following equation:

$$LstopPos = Ltarget - StopOffset \tag{6}$$

This aims at stopping the lens at a position slightly in front of the target stop position in order to prevent an over run to be caused by inertia, position sampling delay and the like. At Step 1403, LstopPos is compared with the current position Lpos by using the following formula:

$$Lpos \geq LstopPos \tag{7}$$

If the formula (7) is satisfied at Step 1403, it means that the lens reached the target stop position so that the flow advances to Step 1406 whereat the target stop position reaching flag is set as fReachPosStop=1, to thereafter terminate the sub-routine CheckLensStopPos.

If the formula (7) is not satisfied at Step 1403, it means that the lens does not reach the target stop position so that the flow advances to Step 1407 whereat the target stop position reaching flag is set as fReachPosStop=0, to thereafter terminate the sub-routine CheckLensStopPos. If the driving direction is the CCW (INF) direction (if fDrvCwCcw=0) at Step 1401, the flow advances to Step 1404 whereat in order to prevent the lens overrun described above, the stop position LstopPos actually stopped is calculated from the target stop position Ltarget by the following equation:

$$L\text{stopPos}=L\text{target}+\text{StopOffset} \quad (8)$$

At Step 1405, LstopPos is compared with the current position Lpos by using the following formula:

$$\text{Lpos} \leq \text{LstopPos} \quad (9)$$

If the formula (9) is satisfied at Step 1405, it means that the lens reached the target stop position so that the flow advances to Step 1406 whereat the process described above is performed to thereafter terminate the sub-routine CheckLensStopPos.

If the formula (9) is not satisfied at Step 1405, the flow advances to Step 1407 whereat the process described above is performed to thereafter terminate the sub-routine CheckLensStopPos.

Figure 15:
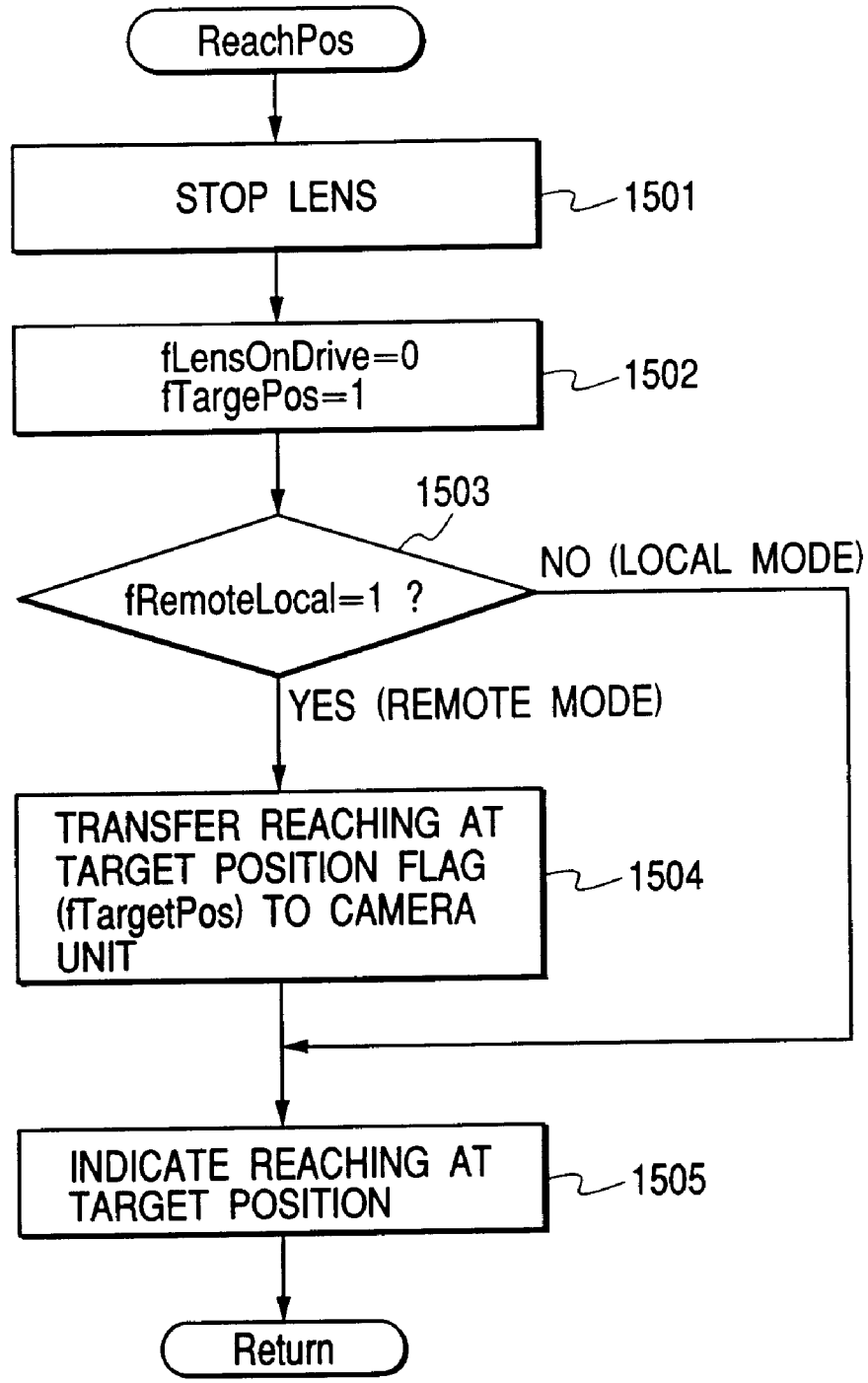
FIG. 15 is a flow chart illustrating a process to be executed when the lens reaches a target stop position in the flow charts shown in FIGS. 3A and 3B.

With reference to FIG. 15, the sub-routine ReachPos will be described.

Sine the lens reached the target stop position, the lens is stopped at Step 1501. At Step 1502 the lend driving flag is set as fLensOnDrive=0 and the target stop position reaching flag is set as fTargetPos=1.

The mode of the lens is checked at Step 1503. If the mode is the remote mode (if fRemoteLocal=1), at Step 1504 the target position reaching flag (fTargetPos=1) is transferred to the camera unit over serial communication.

At Step 1505 an indication that the lens reached the target position is displayed, to thereafter terminate the sub-routine ReachPos. If the mode is the local mode (if fRemoteLocal=0) at Step 1503, the flow advances to Step 1505 to perform a similar operation described above, to thereafter terminate the sub-routine ReachPos.

Figure 16:
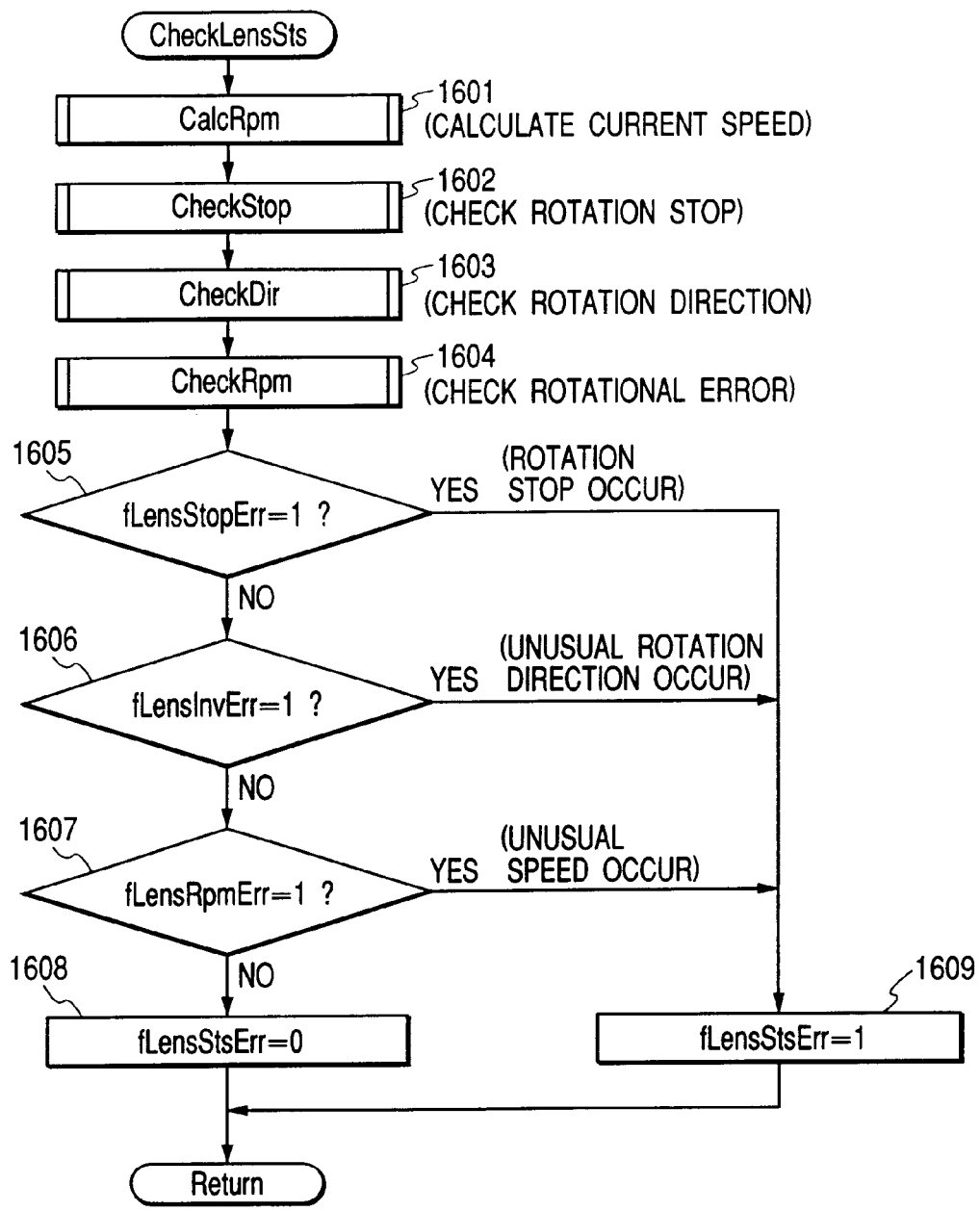
FIG. 16 is a flow chart illustrating a lens state check process in the flow charts shown in FIGS. 3A and 3B.

With reference to FIG. 16 the sub-routine CheckLensSts will be described.

At Step 1601 a sub-routine CalcRpm is called to calculate a current lens speed. At Step 1602, a sub-routine CheckStop is called to check the stop state of the lens. At Step 1603, a sub-routine CheckDir is called to check whether the lens driving direction is the same as the actual rotation direction. At Step 1604 a sub-routine CheckRpm is called to check the state of the current speed.

Thereafter, a flag set at each sub-routine is checked. First at Step 1605 a lens stop state flag fLensStopErr is checked, If fLensStopErr=1, it is judged that the lens is in a halt, and the flow advances to Step 1609 whereat a flag is set as fLensStsErr=1 indicating that the lens is in an over error state, to thereafter terminate the sub-routine CheckLensSts.

If fLensStopErr=0 at Step 1605, it is judged that the lens is being rotated, and the flow advances to Step 1606 whereat a lens rotation direction abnormality flag fLensInvErr is checked. If fLensInvErr=1, it is judged that the lens rotation direction is abnormal and the flow advances to Step 1609.

If fLensInvErr=0, it is judged that the lens rotation direction is normal and the flow advances to Step 1607. At Step 1607 a lens speed abnormality flag fLensRpmErr is checked. If fLensRpmErr=1, it is judged that the lens speed is abnormal so that the flow advances to Step 1609.

If fLensRpmErr=0, it is judged that the speed is normal so that the flow advances to Step 1608 whereat it is judged that the lens operates normally and the flag is set as fLensStsErr=0, to thereafter terminate the sub-routine CheckLensSts.

Figure 17:
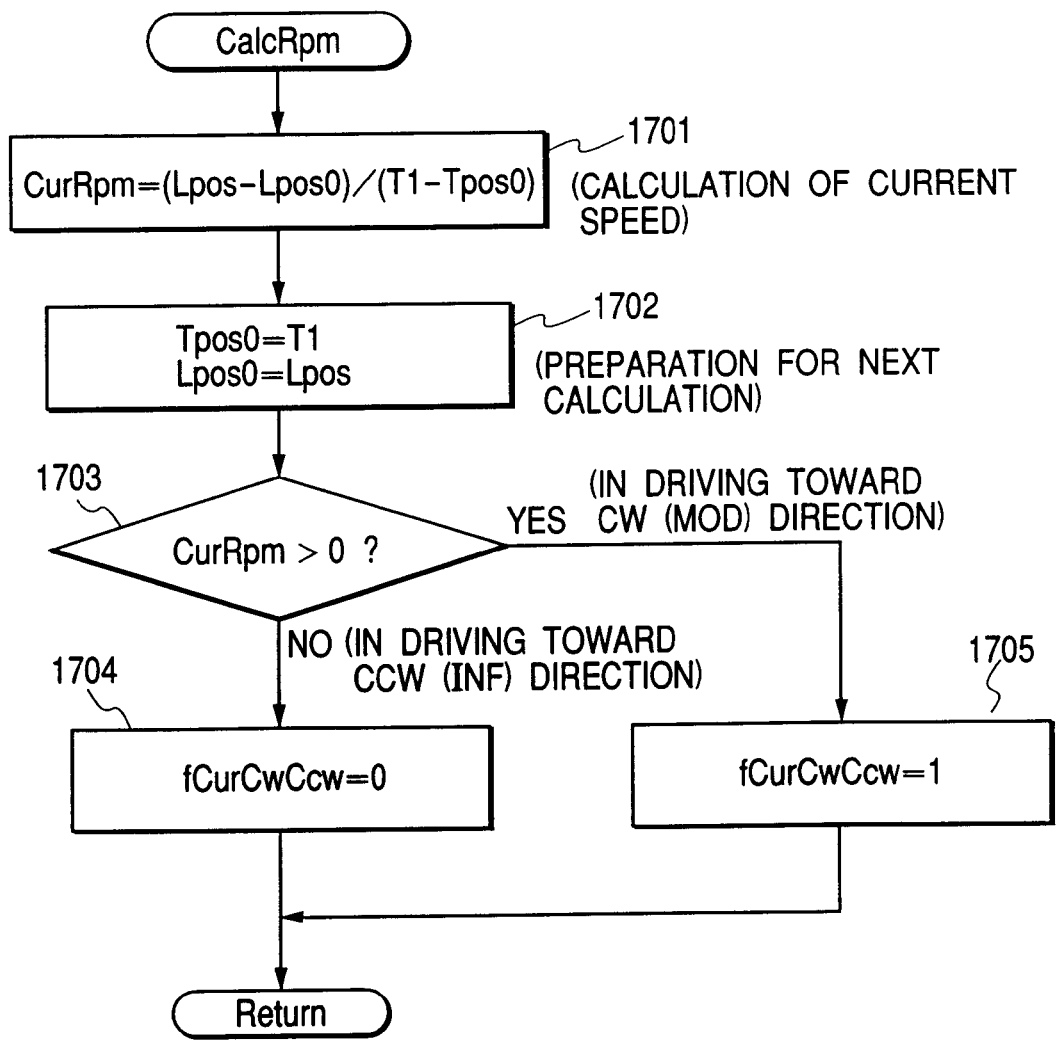
FIG. 17 is a flow chart illustrating a lens speed process in the flow charts shown in FIGS. 3A and 3B.

The sub-routine CalcRpm will be described with reference to FIG. 17.

At Step 1701 the lens current speed is calculated by the following equation:

$$\text{CurRpm}=(L\text{pos}-L\text{pos0})/(T1-T\text{pos0}) \quad (10)$$

At Step 1702 the following process is performed for the preparation of the next calculation:

Load current time: Tpos0=T1; and

Load current position: Lpos0=Lpos.

At Step 1703 the sign of the current speed calculated at Step 1701 is checked by the following formula:

$$\text{CurRpm}>0 \quad (11)$$

If the formula (11) is satisfied, it means that the lens rotates in the CW (MOD) direction and the flow advances to Step 1705 whereat a flag is set as fCurCwCcw=1, to thereafter terminate the sub-routine CalcRpm. If the formula (11) is not satisfied, it means that the lens rotates in the CCW (INF) direction and the flow advances to Step 1704 whereat the flag is set as fCurCwCcw=0, to thereafter terminate the sub-routine CalcRpm.

Figure 18:
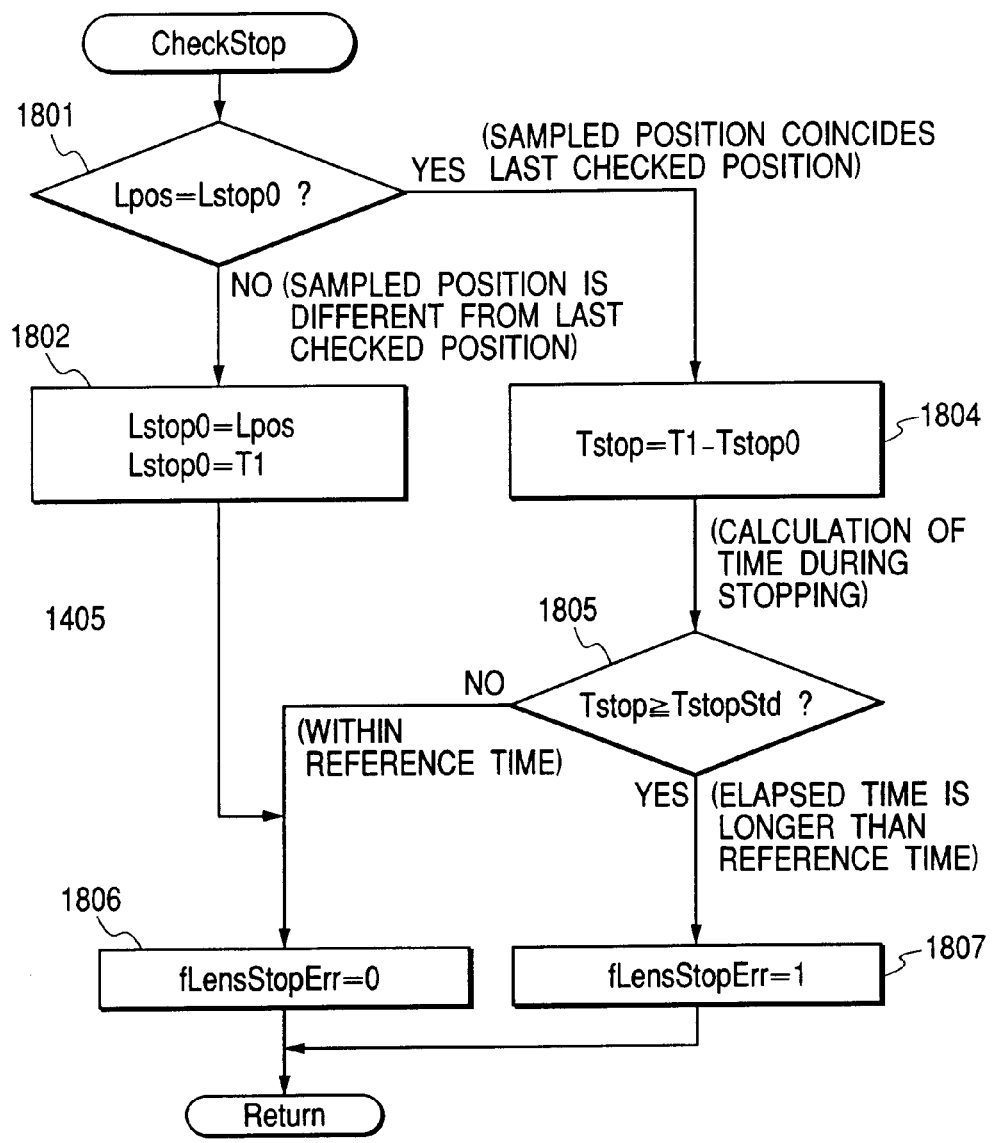
FIG. 18 is a flow chart illustrating a lens stop process in the flow charts shown in FIGS. 3A and 3B.

With reference to FIG. 18, the sub-routine CheckStop will be described.

At Step 1801 the last checked position Lstop0 is compared with the current sampled position Lpos. If they are not coincident, the flow advances to Step 1802 to perform the preparation of the next check:

Store current position: Lstop0=Lpos; and

Store current time: Lstop0=T1.

At Step 1806 the flag is set as fLensStopErr=0 indicating that the lens is not in the halt, to thereafter terminate the sub-routine CheckStop.

If the last checked position Lstop0 is coincident with the current sampled position Lpos at Step 1801, the flow advances to Step 1804 to calculate a stop time by the following equation:

$$T\text{stop}=T1-T\text{stop0} \quad (12)$$

At Step 1805 the calculated stop time Tstop is compared with the stop detection standard time TstopStd by using the following formula:

$$T\text{stop} \geq T\text{stopStd} \quad (13)$$

If the formula (13) is not satisfied, it means that the lens is being driven, and the flow advances to Step 1806, whereas if the formula (13) is not satisfied, the flow advances to Step 1807 to set the flag as fLensStopErr=1 indicating that the lens is in the halt, to thereafter terminate the sub-routine CheckStop.

Figure 19:
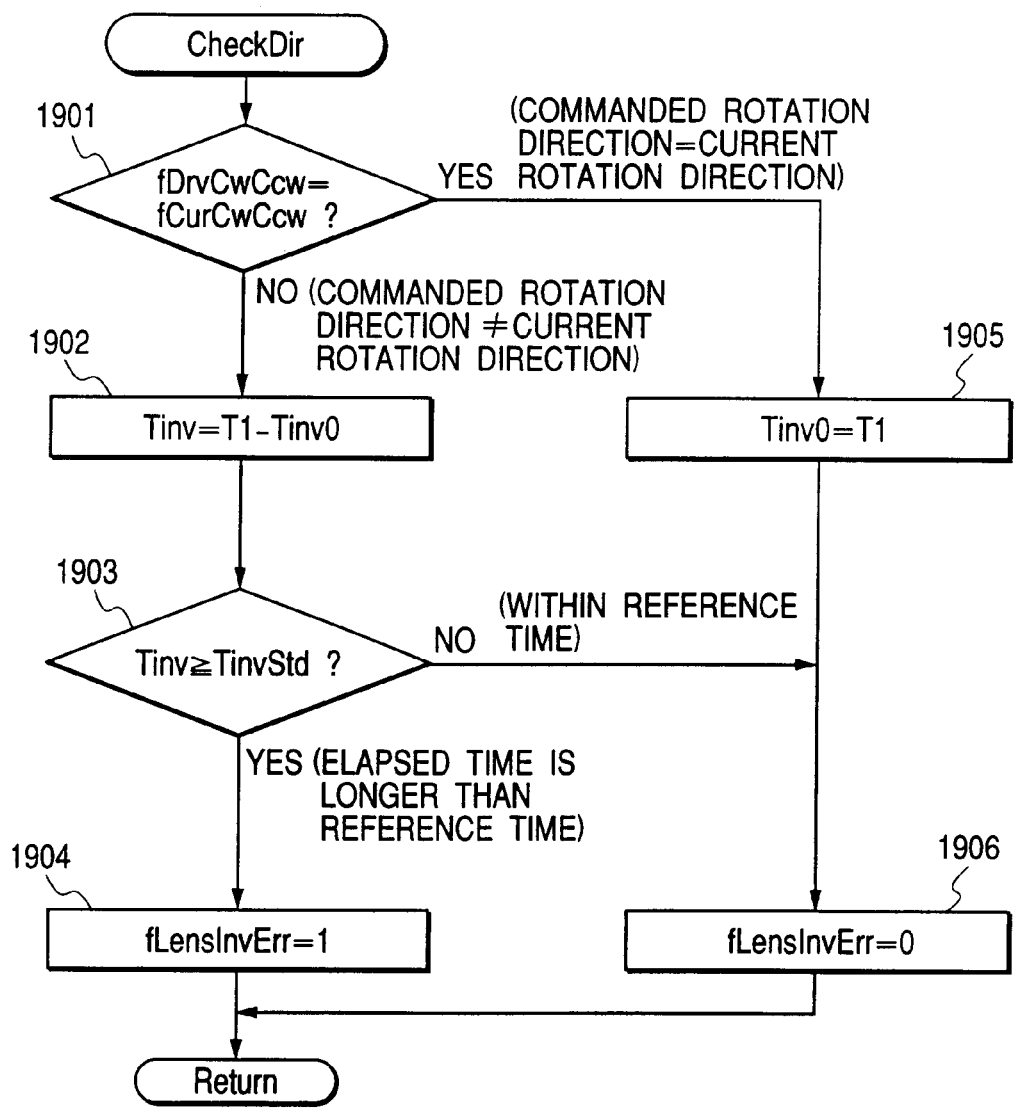
FIG. 19 is a flow chart illustrating a rotation direction process in the flow charts shown in FIGS. 3A and 3B.

With reference to FIG. 19, the sub-routine CheckDir will be described.

At Step 1901 it is checked whether the driving direction flag fDrvCwCcw coincides with the current rotation direction flag fCurCwCcw. If coincident, it means the lens is rotated in the driving direction, and the flow advances to Step 1905 to execute the preparation of the next check:

$$\text{Store current time: Tinv0=T1} \quad (14)$$

At step 1906 the flag is set as fLensInvErr=0 indicating that the lens rotation direction is normal, to thereafter terminate the sub-routine CheckDir.

If the driving direction flag fDrvCwCcw does not coincide with the current rotation direction flag fCurCwCcw, the flow advances to Step 1902 to calculate a rotation direction abnormal time by the following equation:

$$Tinv=T1-Tinv0 \quad (15)$$

Next, at Step 1903 the rotation direction abnormal time Tinv is compared with the inverse motion detection standard time TinvStd by using the following formula:

$$Tinv \geq TinvStd \quad (16)$$

If the formula (16) is not satisfied at Step 1903, it means that the rotation direction abnormal time is shorter than the standard time, and the flow advances to Step 1906.

If the formula (16) is satisfied at Step 1903, it means that the rotation direction abnormal time is longer than the standard time, and at Step 1904 the flag is set as fLensInvErr=1 indicating that the rotation direction abnormality occurred, to thereafter terminate the sub-routine CheckDir.

Figure 20:
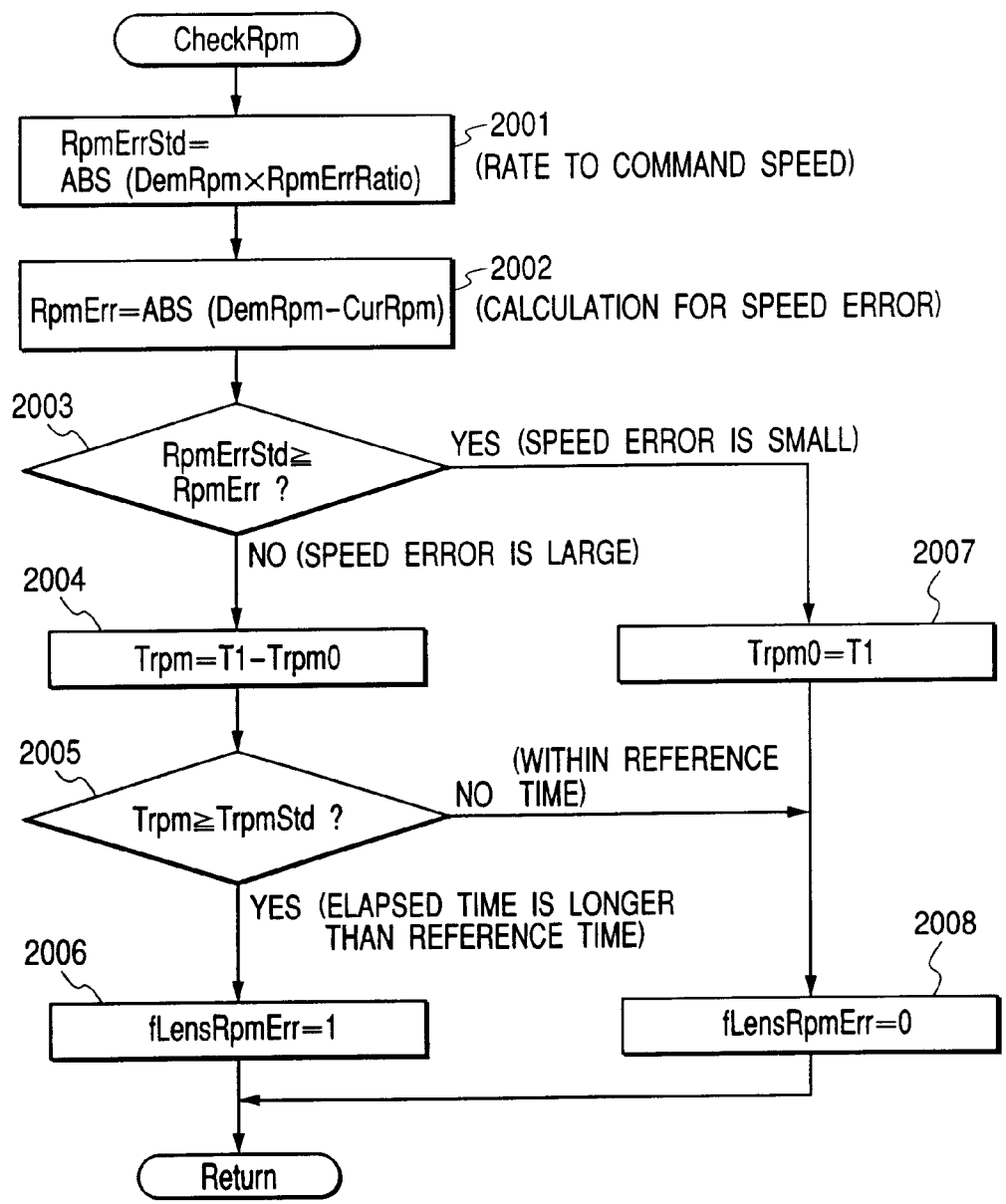
FIG. 20 is a flow chart illustrating a speed error check process in the flow charts shown in FIGS. 3A and 3B.

With reference to FIG. 20, the sub-routine CheckRpm will be described.

At Step 2001 the speed error standard speed RpmErrStd relative to the speed command DemRpm is calculated from the following equation:

$$RpmErrStd=ABS \text{ (DemRpm} \times \text{RpmErrRatio)} \quad (17)$$

At Step 2002 the speed error RpmErr between the speed command DemRpm and the current speed CurRpm is calculated from the following equation:

$$RpmErr=ABS \text{ (DemRpm-CurRpm)} \quad (18)$$

At Step 2003, the speed error standard speed RpmErrStd is compared with the speed error RpmErr by using the following formula:

$$RpmErrStd \geq RpmErr \quad (19)$$

If the formula (19) is satisfied at Step 2003 (if the speed error is considered to be small), it does not mean that the speed error abnormality occurred, and the following process is performed at Step 2007 for the preparation of the next check:

$$\text{Store current time: Trpm0=T1}$$

At Step 2008 the flag is set as fLensRpmErr=0 indicating that the speed abnormality did not occur, to thereafter terminate the sub-routine CheckRpm.

If the formula (19) is not satisfied at Step 2003 (if the speed error is considered to be large), a speed abnormality time is calculated at Step 2004 from the following equation:

$$Trpm=T1-Trpm0 \quad (20)$$

At Step 2005 the calculated abnormality time Trpm is compared with the speed error abnormality detection standard time TrpmStd by using the following formula:

$$Trpm \geq TrpmStd \quad (21)$$

If the formula (21) is not satisfied at Step 2005, it means that the speed abnormality time is shorter than the standard time, and the flow advances to Step 2008, whereas if the formula (21) is satisfied at Step 2005, it means that the speed abnormality time is longer than the standard time, and the flow advances to Step 2006 whereat the flag is set as fLensRpmErr=1, to thereafter terminate the sub-routine CheckRpm.

Figure 21:
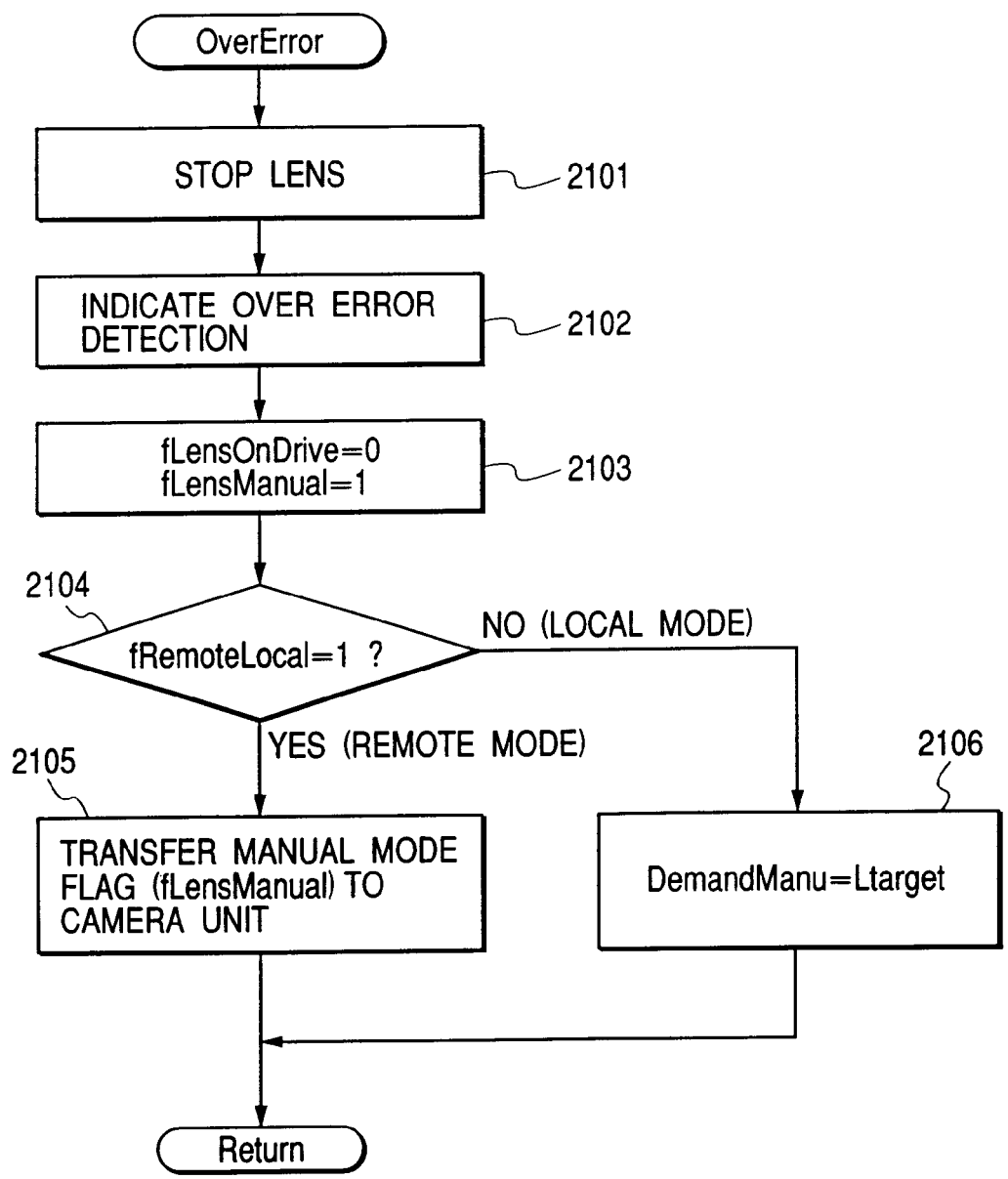
FIG. 21 is a flow chart illustrating a process to be executed when an over error is detected in the flow charts shown in FIGS. 3A and 3B.

With reference to FIG. 21, the sub-routine OverError will be described.

At Step 2101 the lens is stopped. At Step 2102 an indication that the lens stopped in an over error state is displayed. At Step 2103 the following flag process is performed:

Lens driving flag: fLensOnDrive=0;

Lens manual flag: fLensManual=1.

At Step 2104 it is checked whether the mode of the lens is the remote control mode or local mode. If in the remote mode (if fRemoteLocal=1), in order to notify that the lens is in the manual mode, the manual mode flag (fLensManual=1) is transferred to the camera over serial communication.

If in the local mode (if fRemoteLocal=0) at Step 2104, at Step 2106 the target stop position Ltarget is stored as DemandManu as the manual mode release data, to thereafter terminate the sub-routine OverError.

In the local mode, the target stop position Ltarget is stored as DemandManu. However, the demand information may be entered again to store it as the DemandManu, with the same effects as above being expected.

Figure 22:
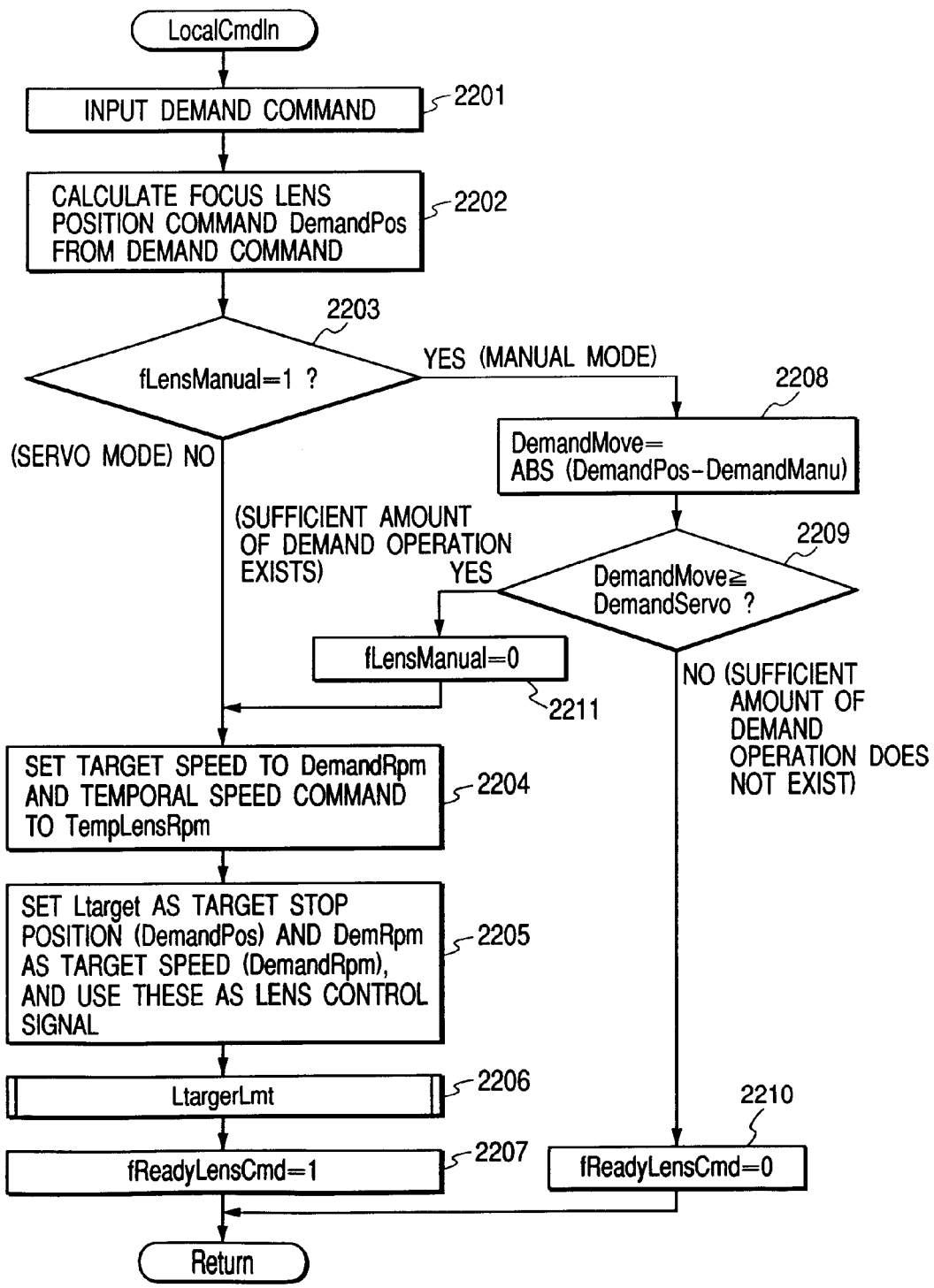
FIG. 22 is a flow chart illustrating a lens local mode process in the flow charts shown in FIGS. 3A and 3B.

With reference to FIG. 22, the sub-routine LocalCmdIn will be described.

At Step 2201 a demand command is input. At Step 2202 a focus/lens position command DemandPos is calculated from the input demand command. This calculation is made because the demand command is not always coincident with the lens motion amount. For example, if an A/D converter of 10 bits is used for inputting a demand command, the range of the A/D converter is 0 to 1024, whereas the full motion range of the focus lens is 0 to 10000. Therefore, the DemandPos is calculated by the following conversion equation:

$$DemandPos=A/D \text{ converted value} \times 10000/1024$$

At Step 2203 it is checked whether the lens is in the manual mode or in the servo mode. If the lens is in the servo mode (if fLensManual 0), the flow advances to Step 2204 whereat a temporal speed TempLensRpm is set to the target speed DemandRpm.

At Step 2205 the focus position demand DemandPos is set to the target stop position Ltarget and the target speed DemandRpm is set to the speed command DemRpm, to use them as lens control signals. In order to check the effective range of the lens control signals, a sub-routine LtargetLmt is called at Step 2206.

At Step 2207 the flag is set as fReadyLensCmd=1 indicating that the lens control commands are prepared, to thereafter terminate the sub-routine Local CmdIn.

If it is judged at Step 2203 that the lens is in the manual mode (if fLensManual=1), at Step 2208 the demand operation amount is calculated by the following equation:

$$DemandMove=ABS \text{ (DemandPos-DemandManu)} \quad (22)$$

At Step 2209 the demand operation amount DemandMove calculated by the equation (22) is compared with a manual mode release demand operation amount DemandServo by using the following formula:

DemandMove ≧ DemandServo      (23)

If the formula (23) is satisfied at Step 2209, it means that the demand operation amount is sufficient, and the flow advances to Step 2211 whereat the flag is set as fLensManual=0 to thereby set the servo mode. Thereafter, the flow advances to Step 2204.

If the formula (23) is not satisfied at Step 2209, it means that the demand operation amount is not sufficient, and at Step 2210 the flag is set as fReadyLensCmd=0 in order not to release the manual mode, to thereby terminate the sub-routine LocalCmdIn.

Figure 29:
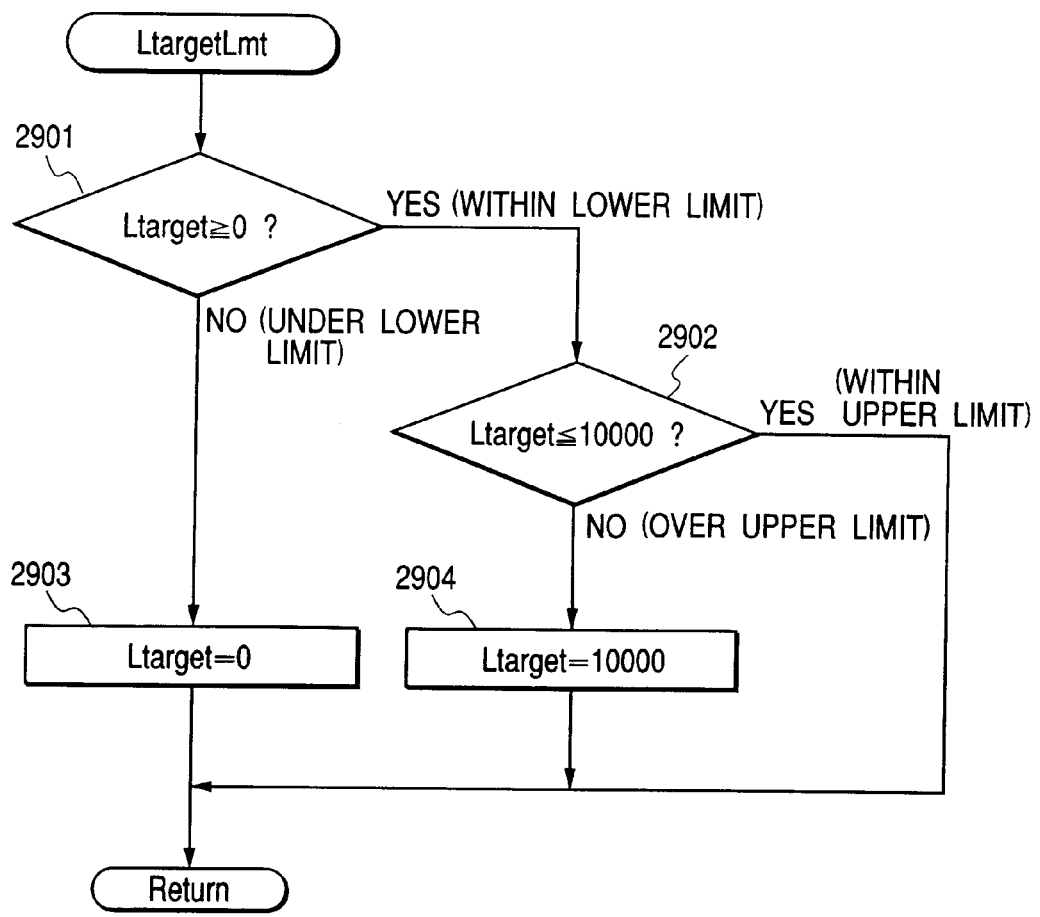
FIG. 29 is a flow chart illustrating a target stop position limit process in the flow charts shown in FIGS. 3A and 3B.

With reference to FIG. 29, the sub-routine LtargetLmt will be described.

At Step 2901 the lower limit of the target stop position Ltarget is checked from the following formula:

Ltarget≧      (24)

If the formula (24) is not satisfied at Step 2901, it means that the target stop position is under the lower limit, and at Step 2903 the target stop position is set with 0, to thereafter terminate the sub-routine LtargetLmt.

If the formula (24) is satisfied at Step 2901, the upper limit is checked at Step 2902 from the following formula:

Ltarget ≦ 10000      (25)

If the formula (25) is not satisfied at Step 2902, the target stop position Ltarget is set with 10000 at Step 2904, to thereafter terminate the sub-routine LtargetLmt.

If the formula (25) is satisfied at Step 2902, it means that the target stop position Ltarget is in the lens control range, so that this target stop position is used as it is, to thereafter terminate the sub-routine LtargetLmt.

Figure 28:
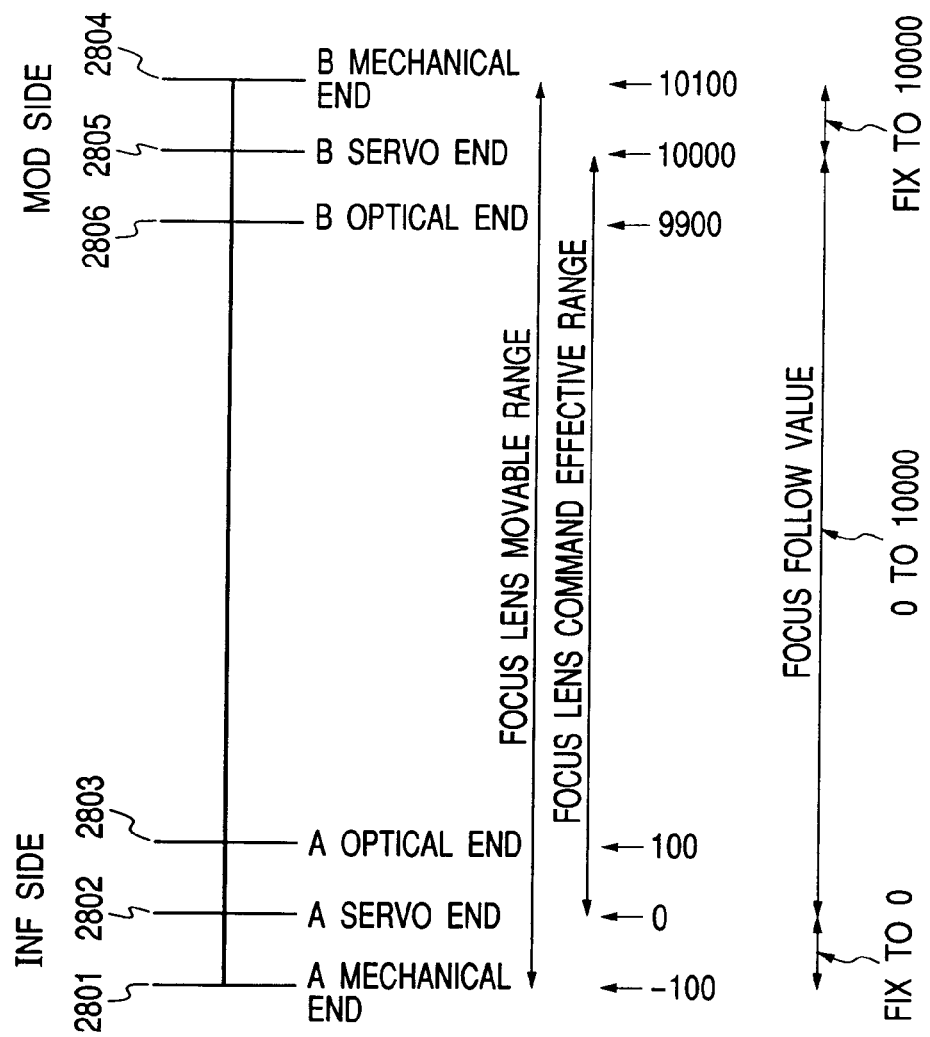
FIG. 28 is a flow chart illustrating an end process in the flow charts shown in FIGS. 3A and 3B.

With reference to FIG. 28, an end process will be described.

As described earlier, the position of the focus lens is determined on the assumption that the INF end is 0 and the MOD end is 10000. These values may be an actual motion value of the focus lens or may be a value normalized in accordance with the common rules of the lens unit and camera unit because the actual motion value may change depending upon the type of a lens.

Information of the values of the INF end and MOD end may be passed between the lens unit and camera unit as the initializing data.

More specifically, information that the value of the position of the focus lens is defined by the reference position (e.g., 0) of the INF end and by the value (e.g., 10000) of the MOD end, is transmitted from the lens unit to the camera unit. The camera unit can judge to which position the focus lens is moved.

The movable range of the focus lens is shown in FIG. 28. On the INF side, there are A mechanical end 2801, A servo end 2802, and A optical end 2803. Similarly on the MOD side, there are B mechanical end 2804, B servo end 2805, and B optical end 2806.

The movable range of the lens is set broader than the optical ends, because a margin is provided to satisfy the specification data when there is a manufacturing error. Therefore, when the lens is operated by the manual operation unit, it can move between the A mechanical end 2801 on the INF side and the B mechanical end 2804 on the MOD side, whereas if the lens is operated in the servo mode, it can move between the A servo end 2802 on the INF side and the B servo end 2805 on the MOD side.

Driving the lens by the camera command or demand command is performed in the servo mode. Therefore, the lens moves between the A servo end 2802 on the INF side and the B servo end 2805 on the MOD side.

It is assumed that if the position of the A servo end 2802 on the INF side is 0 and the position of the B servo end 2805 on the MOD side is 10000, then the positions of the A mechanical end 2801 and A optical end 2803 on the INF side correspond to −100 and 100, and the positions of the B mechanical end 2804 and B optical end 2806 on the MOD side correspond to 10100 and 9900.

With the above position settings, the specification of the optical characteristics can be satisfied both in the manual mode and servo mode.

Consider now that the focus lens exceeds the range between the two servo ends in the manual mode. For example, it is assumed that the position of the lens is −50 and under this state the mode is switched to the servo mode with the lens position command of 0.

In this case, it is necessary to move the lens to the A servo end 2802 on the INF side. A similar case may occur on the MOD side.

Namely, in this case, when the lens is at 10050 between the B serve end 2805 and B mechanical end 2804 in the manual mode, the mode is switched to the servo mode with the position command of 10000 corresponding to the B serve end 2805 on the MOD side. In such cases, if the lens is moved to the servo end, the focussed object may become out-of-focus.

In order to avoid this, if the mode is switched to the servo mode while the focus lens is not in the range between two servo ends in the manual mode, the focus lens is not moved even if the position command with the servo end on the same side is received (if the position command with the A servo end 2802 on the INF side is received if the lens is positioned between the A servo end 2802 and A mechanical end 2801 on the same INF side, or if the position command with the B servo end 2804 on the MOD side is received if the lens is positioned between the B servo end 2805 and B mechanical end 2804 on the same MOD side). In this manner, the focus is not changed unnecessarily when the manual mode is switched to the servo mode.

An overrun may occur if the focus lens in the servo mode is moved upon reception of the position command with the servo end. Also in this case, a process similar to the above can avoid unnecessary focus change.

A focus follow will be described.

In the process to be executed in the lens unit, it is necessary to check the focus position by counting the value between both mechanical ends in order to know the lens position in the manual mode or the overrun at the servo end.

The camera unit is also required to check the focus position. However, in response to a request for a focus follow from the camera unit via serial communication, if the lens unit returns the value different from the servo end, there is a possibility that the camera unit judges that the focus lens is abnormal.

In order to avoid this, if the focus lens moves in excess of the servo end, the value of the focus position with respect to the focus flow is limited to the servo end value. Namely, if the position of the focus lens is −10 on the INF side, the lens unit transmits the focus flow of 0 to the camera unit. This process is also applied to the MOD side.

A speed command priority will be described. When a lens is to be moved to a target position, the lens is moved in accordance with a predetermined speed pattern. If it becomes necessary to stop the lens at any current position while it is moved, a command with the current position is supplied in accordance with the lens follow information to stop the lens at the current position. In this case, however, the lens may be moved in the opposite direction because of a delay in the command or the like, and the lens enters an oscillation mode.

In order to avoid this, a speed zero command is used as the stop command. When the speed zero command is received, the position feedback is neglected and only stopping the lens is performed. In this manner the lens is prevented from entering the oscillation mode. When the speed zero command is received while the lens is in the halt, the lens is not driven.

Next, another case will be described wherein a lens having a communication function described above is used with a camera without a communication function.

Figure 27:
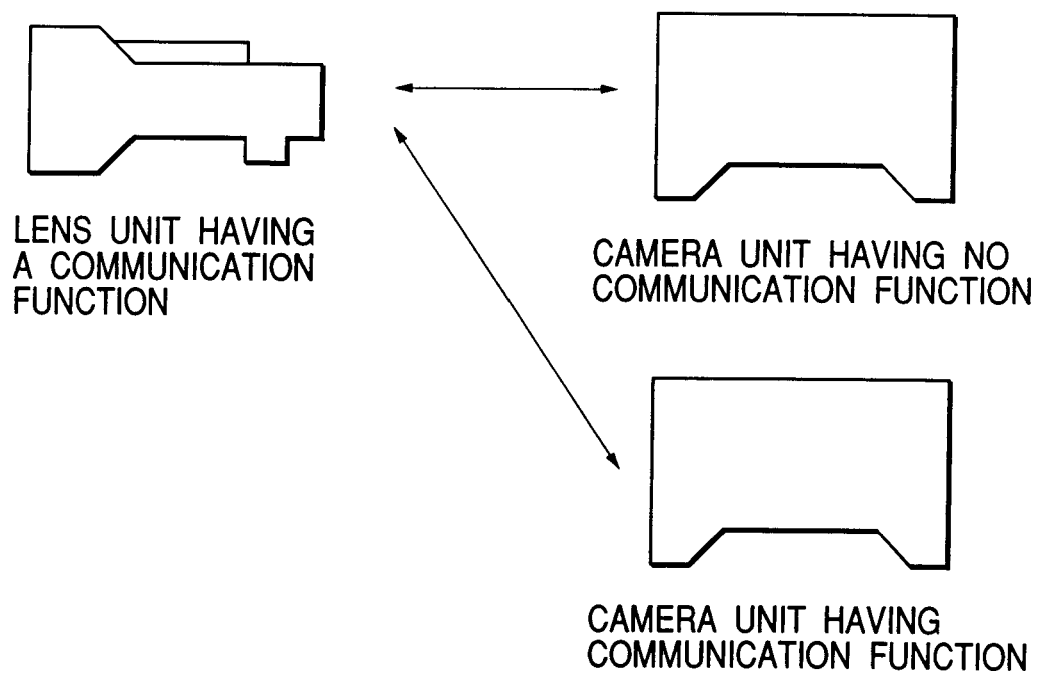
FIG. 27 is a diagram showing a combination of the lens and cameras according to an embodiment of the invention.

As shown in FIG. 27, a lens having a communication function is connected on one hand to a camera without a communication function and on the other hand to a camera with a communication function. With a combination of a lens with a communication function and a camera without a communication function, if R/L-SW 112 is turned on to set the remote mode, the lens cannot be driven by the demand command. In some system, R/L-SW 112 is mounted also on the camera unit, and the remote or local mode can be set by using the communication function. In this case, if the lens unit is set with the remote mode after its power is turned on, the lens cannot be driven by the demand operation.

To avoid this, immediately after the power is turned on, the local mode is made to be set. Further, if R/L-SW 112 of the lens unit is made enable after it is confirmed that the camera unit has a communication function, the above problem can be solved because the local mode is set immediately after the power is turned on even if R/L-SW 112 is set to the remote mode. If the manual mode is made to be set immediately after the power is turned on, it is necessary to change the manual mode to the servo mode by the demand operation. In this case, there is an unnatural feeling of the demand operation to be caused by the dead zone.

To avoid this, the servo mode is made to be set immediately after the power is turned on. In this case, the lens is moved to the position designated by the demand command so that the unnatural feeling of the demand operation does not occur when the manual mode is released.

The communication contents between the lens unit and camera unit and a communication function effective timing of the lens unit will be described, which are characteristic features of the embodiment.

Generally, immediately after a power is turned on (power-on reset), the functions of peripheral IC's other than a CPU and the peripheral function (e.g., serial communication function) of CPU are in an inhibited state in many cases. It is herein assumed that the serial communication function of the embodiment is in an inhibited state immediately after the power is turned on.

The camera unit may perform correction and the like of image data in accordance with information supplied from the lens unit. Such lens unit information includes also fixed information such as focal length information at a wide end, focal length information at a tele end, and extender type information.

If the encoder of a relative value output type is used as in this embodiment, the focus lens position is required to be initialized in order to acquire absolute position information, as described earlier. It is assumed that the iris has a servo system using an encoder of an absolute value output type in order to supply absolute value position data.

Under these conditions, although the fixed data and iris position information requested by the camera unit can be transmitted immediately via serial communication, the focus follow value of the focus lens cannot be transmitted to the camera unit until initialization is completed. Therefore, while some information can be transmitted, some information cannot be transmitted, in response to a request from the camera unit.

Since some information cannot be transmitted and some information can be transmitted in response to a request from the camera unit, there is a possibility of erroneously judging that the lens unit is abnormal. To avoid this, the communication function is disabled or all requests from the camera unit are neglected, until initialization is completed at the lens unit. Namely, information is not transmitted until it becomes that all requests from the camera unit can be responded.

In brief summary of the above, until the absolute position of a lens is established by using a relative value output and initialization of the lens unit is completed:

Setting (1): the communication function is disabled;
Setting (2): even if there is information which can be transmitted, it is not transmitted; and
Setting (3): a request command from the camera unit is made in a reception inhibition state.

With a combination of these settings, the camera unit does not erroneously judge that the lens unit is abnormal.

This will be described with reference to the flow chart shown in FIG. 5. The setting (1) corresponds to the flow chart of FIG. 5. Although not shown, of the Settings (2) and (3), the Setting (2) can be satisfied by permitting only the reception function after Step 502 shown in FIG. 5 and permitting a transmission function at Step 504. The Setting (3) can be satisfied by permitting only the transmission function after Step 502 shown in FIG. 5 and permitting the reception function after Step 504.

Although the permission of only the transmission function or reception function is performed after the data setting Step 502, it may obviously be performed at a timing after or before the data setting Step 501 or 502.

In the above description, in inhibiting serial communication, the focus lens with a relative time output is used by way of example. In addition to the initialization of the focus lens, other initializations exist in the lens system although not shown. For example, an A/D converter, a D/C converter, a peripheral IC oscillator, and the like are required to be initialized. If a double CPU configuration is adopted in the lens system, the communication function (serial communication, FIFO, DPRAM and the like) for CPU's is required to be initialized in order to confirm the ready state of each CPU. Until such initializations are completed and the lens unit is made normally operable, the communication function may be disabled similar to that described above.

In the above description, the fixed values are used for the dead zone and stop offset. They may be variable values changing with the value of the iris, as shown in the table shown in FIG. 25. Namely, data dependent upon the focal depth may be used.

As shown in FIG. 26, the values of the dead zone and stop offset may be multiplied by a multiplication factor depending upon the position of a zoom lens. In this case, the value data may be stored in a table. The values of the dead zone and stop offset may be changed with the value of an extender. If a table is used, the memory area dedicated to the table becomes necessary in some case. In such a case, the values of the dead zone and stop offset may be calculated as a function of the F value, focal length, and extender, as in the following:

Dead zone=f (F value, focal length, extender)
Stop offset=g(F value, focal length, extender)

In the above description, SW(R/L-SW) 112 for selecting the remote mode or local mode is provided in the lens unit. R/L-SW 112 may also be provided in the camera unit to transmit information of the camera unit to the lens unit via serial communication.

If it is set so that the relation of (dead zone) >(stop offset) is maintained, the lens can be stopped in the dead zone corresponding to the target stop position even if the commands with the same target stop position are received consecutively.

Figure 30:
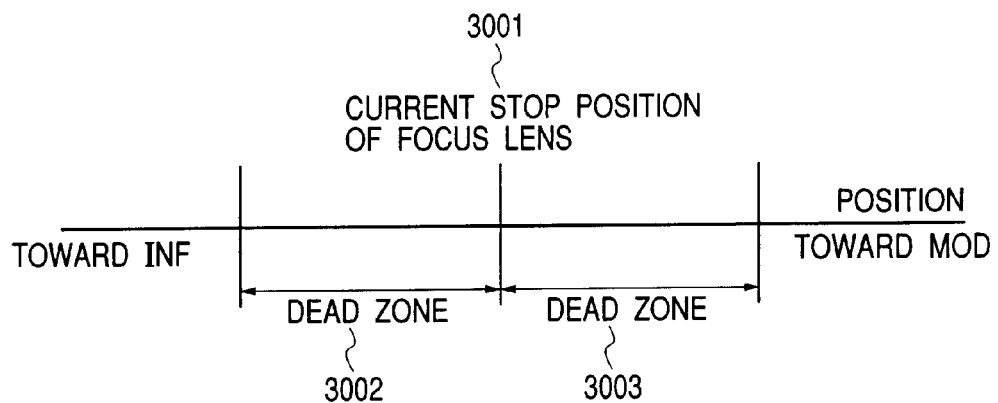
FIG. 30 is a flow chart illustrating a dead zone process in the flow charts shown in FIGS. 3A and 3B.

With reference to FIG. 30, the dead zone of a focus lens will be described. Relative to a current stop position 3001 of the focus lens, a dead zone 3002 exists toward the INF end and a dead zone 3003 exists toward the MOD end. In this state, if the target stop position is between the dead zone 3002 on the INF side and the dead zone 3003 on the MOD side, the focus lens does not start being driven.

If the target stop position is not between the dead zone 3002 on the INF side and the dead zone 3003 on the MOD side, the focus lens starts being driven in accordance with a motion distance from the current stop position to the target stop position.

Figure 31:
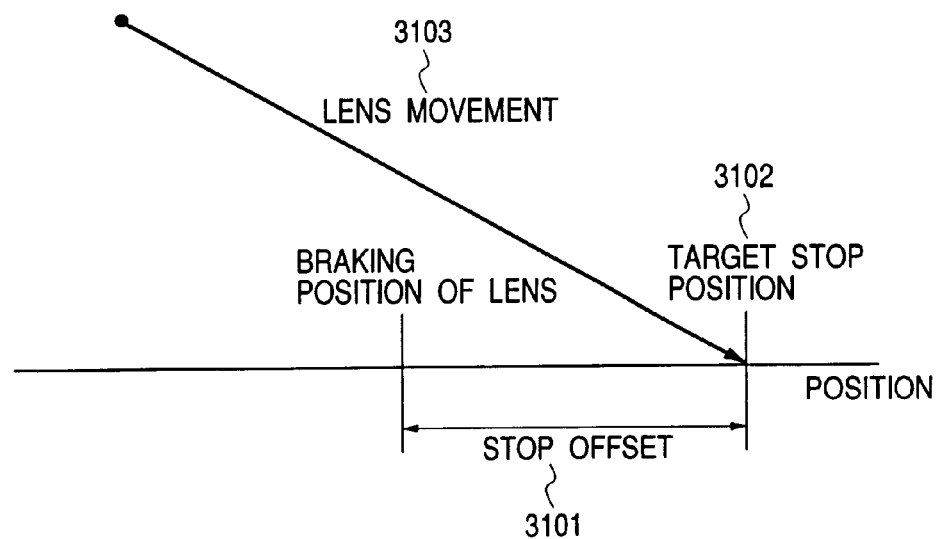
FIG. 31 is a flow chart illustrating a stop offset process in the flow charts shown in FIGS. 3A and 3B.

With reference to FIG. 31, the stop offset will be described. It is assumed that the lens moves along a motion locus 3103 toward the target stop position 3102. When the lens reaches a position which took the stop offset into consideration, the focus lens is braked. By braking the lens while the inertia of the lens is taken into consideration relative to the target stop position 3102, it is possible to prevent the lens actual stop position from greatly deviating from the target stop position.

In the embodiment, the dead zone and stop offset are set so that the relation of (dead zone)≧(stop offset) is maintained. The relation of (dead zone)≦(stop offset) may also be set to stop the lens in the dead zone, if the stop offset is near the dead zone. This is because, the lens has essentially inertia and it cannot be stopped at once when it is braked.

Figure 23:
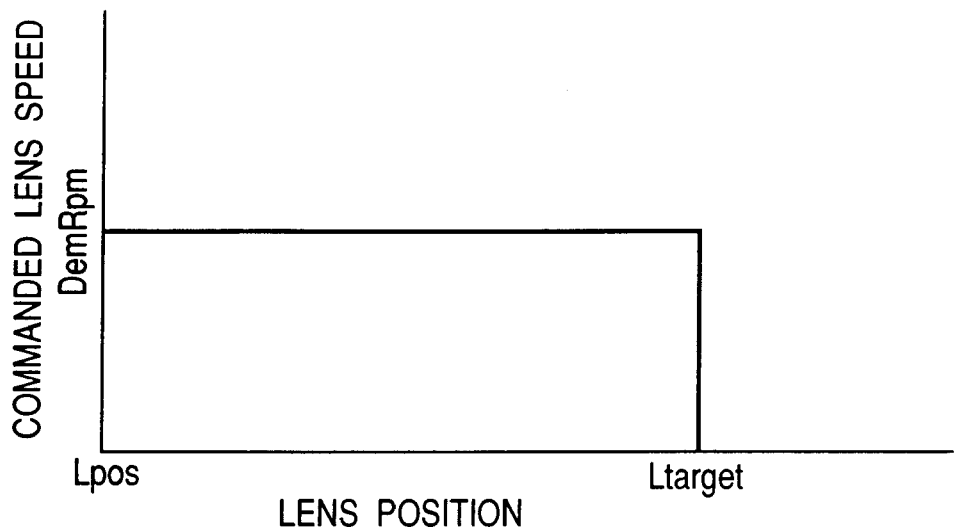
FIG. 23 is a diagram showing a driving speed pattern 1 of the lens driven in accordance with the process executed in the flow charts shown in FIGS. 3A and 3B.
Figure 24:
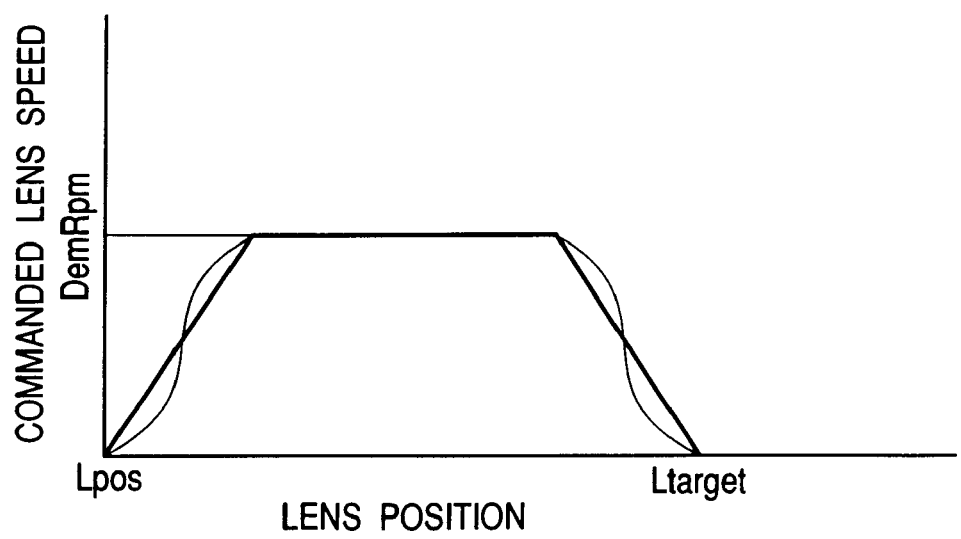
FIG. 24 is a diagram showing a driving speed pattern 2 of the lens driven in accordance with the process executed in the flow charts shown in FIGS. 3A and 3B.

In the above embodiment, it is assumed that the lens is driven at a constant speed of the lens speed command DemRpm, as shown in FIG. 23. The lens may be driven with a trapezoidal pattern having a maximum speed of the speed command DemRpm or with a S-character curved trapezoidal pattern, as shown in FIG. 24. The unit of speed may be other units such as an angular velocity instead of RPM.

Although the setting data having a specific value is used, the invention is not limited thereto; but other values may obviously used.

If data is stored in a rewritable non-volatile memory such as EEPROM, the data customized for each lens can be stored so that user preference of data becomes possible.

In the above description, the focus lens is used by way of example only. The invention is also applicable to a zoom lens, an iris, a wobbling lens used for AF, and the like. An interface between the camera unit and lens unit is not limited only to a serial interface, but a parallel interface may also be used.

What is claimed is:

1. An optical device having information means for generating or determining information on the basis of a necessary initializing operation and communication means for communicating with a camera mounted on the optical device, the optical device comprising:

initializing means for executing the initializing operation; and communication inhibiting means for inhibiting the communication by said communication means until said initializing means completes the initializing operation of all of said optical device;

wherein said communication means is transmission means for transmitting data to the camera, and said communication inhibiting means is transmission inhibiting means for inhibiting transmission of the information by said transmission means from said information means, until the initializing operation is completed; and further comprising a movable member and detection means for detecting a motion state of said movable member as relative information, wherein said initializing means moves said movable member to a reference position and makes said information means generate a position of said movable member at the reference position as absolute position information.

2. An optical device having information means for generating or determining information on the basis of a necessary initializing operation and communication means for communicating with a camera mounted on the optical device, the optical device comprising:

initializing means for executing the initializing operation; and communication inhibiting means for inhibiting the communication by said communication means until said initializing means completes the initializing operation of all of said optical device;

wherein said communication means is transmission means for transmitting data to the camera, and said communication inhibiting means is transmission inhibiting means for inhibiting transmission of the information by said transmission means from said information means, until the initializing operation is completed;

further comprising a movable member and detection means for detecting a motion state of said movable member as relative information, wherein said initializing means moves said movable member to a reference position and makes said information means generate a position of said movable member at the reference position as absolute position information;

wherein said communication means is reception means for receiving a request from the camera, and said communication inhibiting means is reception inhabiting means for inhibiting reception of the request from the camera by said reception means, until the initializing operation is completed, and further comprising a movable member and detection means for detecting a motion state of said movable member as relative information, wherein said initializing means moves said movable member to a reference position and makes said information means generate a position of said movable member at the reference position as absolute position information.

3. An optical device having information means for generating or determining information on the basis of a necessary initializing operation and communication means for communicating with a camera mounted on the optical device, the optical device comprising:

initializing means for executing the initializing operation; and communication inhibiting means for inhibiting the communication by said communication means until said initializing means completes the initializing operation, wherein said communication means comprises reception means for receiving a request from the camera and transmission means for transmitting a plurality of data sets including the information from said information means, to the camera in response to the request, and said communication inhibiting means is inhibiting means for inhabiting reception of the request by said reception means until the initializing operation is completed.

4. An optical device having information means for generating or determining information on the basis of a necessary initializing operation and communication means for communicating with a camera mounted on the optical device, the optical device comprising:

initializing means for executing the initializing operation; and communication inhibiting means for inhibiting the communication by said communication means until said initializing means completes the initializing operation, the optical device further comprising a movable member and detection means for detecting a motion state of said movable member as relative information, wherein said initializing means moves said movable member to a reference position and makes said information means generate a position of said movable member at the reference position as absolute position information.

5. An optical device according to claim 3, further comprising a movable member and detection means for detecting a motion state of said movable member as relative information, wherein said initializing means moves said movable member to a reference position and makes said information means generate a position of said movable member at the reference position as absolute position information.

6. An optical device having movable optical means, signal generating means for forming a signal change corresponding to a motion of said optical means, position information generating means for generating position information by forming a signal corresponding to the number of signal changes formed by said signal generating means, and communication means for communicating with a camera mounted on the optical device, the optical device comprising:

initializing means for moving said optical means to a reference position so as to convert the position information generated by said position information generating means into absolute position information; and communication inhibiting means for inhibiting communication by said communication means until an initializing operation by said initializing means is completed.

7. A system including an optical device having information means for generating or determining information on the basis of a necessary initializing operation and communication means for communicating with a camera mounted on the optical device, the optical device comprising:

initializing means for executing the initializing operation; and communication inhibiting means for inhibiting the communication by said communication means until said initializing means completes the initializing operation, wherein said communication means comprises reception means for receiving a request from the camera and transmission means for transmitting a plurality of data sets including the information from said information means, to the camera in response to the request, and said communication inhibiting means is inhibiting means for inhabiting reception of the request by said reception means until the initializing operation is completed.

8. A system including an optical device having information means for generating or determining information on the basis of a necessary initializing operation and communication means for communicating with a camera mounted on the optical device, the optical device comprising:

initializing means for executing the initializing operation; and communication inhibiting means for inhibiting the communication by said communication means until said initializing means completes the initializing operation, the optical device further comprising a movable member and detection means for detecting a motion state of said movable member as relative information, wherein said initializing means moves said movable member to a reference position and makes said information means generate a position of said movable member at the reference position as absolute position information.

* * * * *